(12) United States Patent
Yang et al.

(10) Patent No.: US 12,457,669 B2
(45) Date of Patent: Oct. 28, 2025

(54) LIGHT-EMITTING DEVICE DRIVING CIRCUIT, PPG SENSOR, AND ELECTRONIC DEVICE

(71) Applicant: Huawei Technologies Co., Ltd., Shenzhen (CN)

(72) Inventors: Sulin Yang, Shenzhen (CN); Yi Xi, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 104 days.

(21) Appl. No.: 18/576,893

(22) PCT Filed: Jun. 29, 2022

(86) PCT No.: PCT/CN2022/102468
§ 371 (c)(1),
(2) Date: Jan. 5, 2024

(87) PCT Pub. No.: WO2023/280036
PCT Pub. Date: Jan. 12, 2023

(65) Prior Publication Data
US 2025/0098051 A1     Mar. 20, 2025

(30) Foreign Application Priority Data

Jul. 7, 2021 (CN) .......................... 202110767722.X

(51) Int. Cl.
*H05B 45/347* (2020.01)
*A61B 5/024* (2006.01)
(Continued)

(52) U.S. Cl.
CPC ....... *H05B 45/347* (2020.01); *A61B 5/02433* (2013.01); *H05B 45/375* (2020.01); *H05B 45/38* (2020.01); *H05B 47/105* (2020.01)

(58) Field of Classification Search
CPC .... H05B 45/347; H05B 45/375; H05B 45/38; H05B 47/105; H05B 45/46; H05B 45/20;
(Continued)

(56) References Cited

U.S. PATENT DOCUMENTS 8,044,609 B2 * 10/2011 Liu ...................... H05B 45/347
315/312
8,680,787 B2 * 3/2014 Veskovic ............... H05B 45/44
315/246
(Continued)

FOREIGN PATENT DOCUMENTS

TW            200723654 A     6/2007

*Primary Examiner* — Renan Luque
(74) *Attorney, Agent, or Firm* — Conley Rose, P.C.

(57) ABSTRACT

A light-emitting device driving circuit includes: a voltage conversion circuit, at least one light-emitting device, a current driving circuit, and a controller. Any light-emitting device and the current driving circuit are coupled in series between an output terminal and a ground terminal of the voltage conversion circuit. The controller is configured to output a first control signal to the current driving circuit, the current driving circuit is configured to provide a predetermined current for a first light-emitting device based on the first control signal, the controller is configured to output a second control signal to the voltage conversion circuit based on an electrical parameter on a path on which the first light-emitting device and the current driving circuit are located, and the voltage conversion circuit is configured to adjust a voltage at the output terminal of the voltage conversion circuit based on the second control signal.

20 Claims, 9 Drawing Sheets

(51) Int. Cl.
*H05B 45/375* (2020.01)
*H05B 45/38* (2020.01)
*H05B 47/105* (2020.01)

(58) Field of Classification Search
CPC ... H05B 45/37; A61B 5/02433; A61B 5/0022;
A61B 5/6898; A61B 5/02427; A61B
5/14552; A61B 5/7225
See application file for complete search history.

(56) References Cited

U.S. PATENT DOCUMENTS

| | | | |
|---|---|---|---|
| 2011/0062887 A1 | 3/2011 | Hsu et al. | |
| 2019/0254130 A1* | 8/2019 | Chen | H05B 45/14 |
| 2020/0245432 A1* | 7/2020 | Lee | H05B 45/10 |
| 2021/0121109 A1 | 4/2021 | Lamminmaki et al. | |

* cited by examiner

LIGHT-EMITTING DEVICE DRIVING CIRCUIT, PPG SENSOR, AND ELECTRONIC DEVICE

CROSS-REFERENCE TO RELATED APPLICATIONS

This is a U.S. National Stage of International Patent Application No. PCT/CN2022/102468 filed on Jun. 29, 2022, which claims priority to Chinese Patent Application No. 202110767722.X filed on Jul. 7, 2021. Both of the aforementioned applications are hereby incorporated by reference in their entireties.

TECHNICAL FIELD

This application relates to the field of electronic devices, and in particular, to a light-emitting device driving circuit, a photoplethysmograph PPG sensor, and an electronic device.

BACKGROUND

Currently, light-emitting devices such as a laser diode (laser diode, LD) or a light-emitting diode (light-emitting diode, LED) are widely used in an electronic device. Generally, in the electronic device, the light-emitting device is mainly used to implement functions such as backlight display, measurement (for example, measurement of a distance and a biological feature of a human body), signal indication, and lighting. For example, a photoplethysmograph (photoplethysmograph, PPG) sensor mainly drives the light-emitting device to transmit a test optical signal. A part of the test optical signal is reflected inside skin or in a skin interface, and a part of the test optical signal is scattered inside the skin. A part of the scattered optical signal returns to the PPG sensor and is received by a detector of the PPG sensor, and the part of scattered signal is referred to as a backscattered signal. In addition to receiving a part of the scattered signal, the detector further receives a part of the reflected signal. A human body can be continuously measured by using the backscattered signal or the reflected signal, to collect data such as a heart rate and blood oxygen.

Currently, power consumption of the PPG sensor is high (power consumption of the PPG sensor in a band accounts for about 40% of power consumption of an entire system, and power consumption of the PPG sensor in a watch accounts for about 15% of power consumption of an entire system). Particularly, when deep skin is tested, a driving current of the light-emitting device needs to be further increased. High power consumption restricts the use of real-time heart rate detection and continuous blood oxygen detection on some wearable devices. In the future, more health functions need to be provided based on the PPG sensor, and real-time heart rate detection and continuous blood oxygen detection are necessary. Therefore, power consumption of the PPG sensor needs to be reduced. In the PPG sensor, power consumption of the light-emitting device accounts for a major part, and power consumption of the PPG sensor can be greatly reduced by reducing power consumption of the light-emitting device. Therefore, how to improve power supply efficiency of the light-emitting device becomes a key to reducing power consumption of an entire system.

SUMMARY

Embodiments of this application provide a light-emitting device driving circuit, a photoplethysmograph PPG sensor, and an electronic device, to improve power supply efficiency of a light-emitting device.

To achieve the foregoing objective, the following technical solutions are used in this application.

According to a first aspect, a light-emitting device driving circuit is provided. The light-emitting device driving circuit includes: a voltage conversion circuit, at least one light-emitting device, a current driving circuit, and a controller. Any light-emitting device and the current driving circuit are connected in series between an output terminal and a ground terminal of the voltage conversion circuit. The controller is configured to output a first control signal to the current driving circuit, the current driving circuit is configured to provide a predetermined current for a first light-emitting device based on the first control signal, the controller is configured to output a second control signal to the voltage conversion circuit based on an electrical parameter on a path on which the first light-emitting device and the current driving circuit are located, and the voltage conversion circuit is configured to adjust a voltage at the output terminal of the voltage conversion circuit based on the second control signal. In this way, when the controller controls, by using the first control signal, the current driving circuit to output the predetermined current to the first light-emitting device in the at least one light-emitting device, the controller may output the second control signal to the voltage conversion circuit based on the electrical parameter on the path on which the first light-emitting device and the current driving circuit are located. Therefore, the voltage conversion circuit can adjust the voltage at the output terminal in real time based on the second control signal, and no longer supplies power to all light-emitting devices with a maximum fixed voltage to enable the light-emitting devices to work in an extreme (maximum current) scenario, thereby improving power supply efficiency of the light-emitting device, and reducing power consumption of an entire system.

In a possible implementation, the current driving circuit includes a current source and a transfer switch circuit, a common terminal of the transfer switch circuit is coupled to the current source, and any light-emitting device is coupled to any selection terminal of the transfer switch circuit. The first control signal includes a switch control signal and a current control signal. The transfer switch circuit is configured to connect, based on the switch control signal, the common terminal and a selection terminal coupled to the first light-emitting device, to couple the current source to the first light-emitting device. The switch control signal is synchronous with a lighting sequence of the first light-emitting device, to be specific, the first light-emitting device is lighted when the switch control signal controls the current source to be coupled to the first light-emitting device. The current source is configured to provide the predetermined current for the first light-emitting device based on the current control signal. In addition, the first control signal and the second control signal corresponding to the same first light-emitting device need to be processed synchronously. For example, the second control signal controls the voltage conversion circuit only when the first control signal controls the current driving circuit to drive the first light-emitting device to be lighted, or before the first control signal controls the current driving circuit to drive the first light-emitting device to be lighted, or after a moment at which the first control signal controls the current driving circuit to drive the first light-emitting device to be lighted, where advanced or lagged (delayed) time may be configured randomly.

In a possible implementation, the electrical parameter includes a voltage drop of the current driving circuit. The controller is configured to: detect the voltage drop of the current driving circuit, and output the second control signal to the voltage conversion circuit based on the voltage drop, where when the voltage drop is greater than a specified threshold, the second control signal is used to control the voltage conversion circuit to decrease the voltage at the output terminal, and when the voltage drop is less than the specified threshold, the second control signal is used to control the voltage conversion circuit to increase the voltage at the output terminal. In this possible implementation, a voltage drop or a voltage headroom (Headroom voltage) of the current source may be used to implement automatic voltage adjustment of the voltage conversion circuit.

In a possible implementation, the electrical parameter includes a driving current of the first light-emitting device, and the controller is configured to output the second control signal to the voltage conversion circuit based on the driving current of the first light-emitting device. In this possible implementation, the driving current of the first light-emitting device may be used to implement automatic voltage adjustment of the voltage conversion circuit. For example, if a current of the current source increases or the driving current of the first light-emitting device (certainly, on a series circuit, the current of the current source is equal to the driving current of the first light-emitting device) increases, an output voltage of the voltage conversion circuit is increased; or if the current of the current source increases or the driving current of the first light-emitting device decreases, the output voltage of the voltage conversion circuit is decreased. In this way, an additional voltage drop or headroom voltage of the current source is decreased, thereby reducing power consumption of a system.

In a possible implementation, the controller is specifically configured to: query, based on a lookup table, an expected voltage value corresponding to the driving current of the first light-emitting device, and output the second control signal to the voltage conversion circuit based on the expected voltage value, where the second control signal is used to control the voltage conversion circuit to output the expected voltage value at the output terminal.

In a possible implementation, the controller is specifically configured to: calculate, based on a specified formula, an expected voltage value corresponding to the driving current of the first light-emitting device, and output the second control signal to the voltage conversion circuit based on the expected voltage value, where the second control signal is used to control the voltage conversion circuit to output the expected voltage value at the output terminal.

In a possible implementation, the controller is further configured to sequentially output, to the current driving circuit in descending order or ascending order of voltages at the output terminal of the voltage conversion circuit that correspond to at least two light-emitting devices, the first control signal corresponding to each light-emitting device. In this way, a capacitor at the output terminal of the voltage conversion circuit is in a continuous charging state or a continuous discharging state, thereby avoiding a loss caused by alternating charging and discharging of the capacitor in a PRF periodicity.

In a possible implementation, the voltage conversion circuit includes at least any one of the following: a boost (boost) circuit and a buck-boost (buck-boost) circuit.

According to a second aspect, a light-emitting device driving circuit is provided. The light-emitting device driving circuit includes: a voltage conversion circuit, at least one light-emitting device, a current driving circuit, and a controller. The voltage conversion circuit includes a feedback terminal and an output terminal, a first resistor and a second resistor are connected in series between the output terminal and the ground terminal, and a point that connects the first resistor and the second resistor is coupled to the feedback terminal. A first light-emitting device is connected in series between the output terminal and the current driving circuit, and a third resistor is coupled between the feedback terminal and a point that connects the first light-emitting device and the current driving circuit. The controller is configured to output a first control signal to the current driving circuit; the current driving circuit is configured to provide a predetermined current for the first light-emitting device based on the first control signal; and the voltage conversion circuit is configured to: when determining that a first voltage at the feedback terminal is greater than a predetermined voltage value, control to decrease a voltage at the output terminal; or when determining that a second voltage at the feedback terminal is less than the predetermined voltage value, control to increase the voltage at the output terminal. A working principle of the voltage conversion circuit is as follows: When a voltage at the feedback terminal FB is greater than the predetermined voltage value Vref, the voltage conversion circuit decreases an output voltage at Vout; or when the voltage at the feedback terminal FB is less than the predetermined voltage value Vref, the voltage conversion circuit increases the output voltage at the output terminal Vout. Through such feedback control, the voltage at the feedback terminal FB is finally stabilized at Vref, that is, the voltage at the output terminal Vout of the voltage conversion circuit is stabilized at Vref*(R1+R2)/R2, where R1 is the first resistor, and R2 is the second resistor. In this way, a resistor may be connected from one terminal (a cathode of an LED) of each light-emitting device to the feedback terminal FB of the voltage conversion circuit 71, to implement automatic adjustment of the voltage at the output terminal Vout of the voltage conversion circuit 71. In this way, a resistor may be connected from one terminal (a cathode of an LED) of each light-emitting device to the feedback terminal FB of the voltage conversion circuit, to implement automatic adjustment of the voltage at the output terminal Vout of the voltage conversion circuit. A specific process is as follows (it is assumed that a driving current of each light-emitting device is fixed). After the voltage conversion circuit is started, when no current flows through the light-emitting device, the output voltage at Vout is Vref*(R1+R2)/R2 (actually, a weak current flows through the LED, which causes a change in the output voltage, but does not affect process analysis). The predetermined current is output after the current driving circuit is turned on, and a voltage flows through the selected first light-emitting device, to form a voltage drop on the current driving circuit. If the voltage drop of the current driving circuit increases, the voltage at the feedback terminal FB is increased. When the first voltage at the feedback terminal FB is greater than the predetermined voltage value, the voltage conversion circuit decreases the output voltage at Vout. After the voltage output by the output terminal Vout of the voltage conversion circuit decreases, because a voltage drop of the first light-emitting device remains unchanged, the voltage drop of the current driving circuit is decreased, causing a decrease in the voltage at the feedback terminal FB. Finally, the voltage at the feedback terminal FB is kept in a critical state of Vref. Finally, the voltage at the output terminal Vout of the voltage conversion circuit is Vout=Vref*[1/Rx+1/R2+1/R1]  *R1−Vdrop_tx*R1/Rx, where Rx is the third resistor.

In a possible implementation, the current driving circuit includes a current source and a transfer switch circuit, a common terminal of the transfer switch circuit is coupled to the current source, and any light-emitting device is coupled to any selection terminal of the transfer switch circuit. The first control signal includes a switch control signal and a current control signal. The transfer switch circuit is configured to connect, based on the switch control signal, the common terminal and a selection terminal coupled to the first light-emitting device, to couple the current source to the first light-emitting device. The current source is configured to provide the predetermined current for the first light-emitting device based on the current control signal.

In a possible implementation, the controller is further configured to sequentially output, to the current driving circuit in descending order or ascending order of voltages at the output terminal of the voltage conversion circuit that correspond to at least two light-emitting devices, the first control signal corresponding to each light-emitting device. In this way, a capacitor at the output terminal of the voltage conversion circuit is in a continuous charging state or a continuous discharging state, thereby avoiding a loss caused by alternating charging and discharging of the capacitor in a PRF periodicity.

In a possible implementation, the voltage conversion circuit includes at least any one of the following: a boost (boost) circuit and a buck-boost (buck-boost) circuit.

According to a third aspect, a PPG sensor is provided, including a detector and the light-emitting device driving circuit according to the first aspect or the second aspect. The detector is configured to detect a test optical signal of the light-emitting device that is reflected and/or scattered by a detected object.

According to a fourth aspect, an electronic device is provided, including the light-emitting device driving circuit according to the first aspect or the second aspect, or the PPG sensor according to the third aspect.

For technical effects brought by any one of the possible implementations of the third aspect and the fourth aspect, refer to technical effects brought by different implementations of the first aspect or the second aspect. Details are not described herein again.

BRIEF DESCRIPTION OF DRAWINGS

To describe the technical solutions in embodiments of this application or in the background more clearly, the following describes the accompanying drawings that need to be used in embodiments of this application or in the background.

DESCRIPTION OF EMBODIMENTS

The following describes the technical solutions in embodiments of this application with reference to the accompanying drawings in embodiments of this application. Apparently, the described embodiments may be some rather than all of embodiments of this application.

Unless otherwise defined, all technical and scientific terms used in this specification have meanings the same as meanings well known to by a person of ordinary skill in the art. In this application, "at least one" means one or more, and "a plurality of" means two or more. The term "and/or" describes an association relationship between associated objects, and represents that three relationships may exist. For example, "A and/or B" may represent the following cases: Only A exists, both A and B exist, and only B exists, where A and B may be singular or plural. The character "/" generally indicates an "or" relationship between associated objects. "At least one of the following items" or a similar expression thereof means any combination of these items, including a singular item or any combination of plural items. For example, at least one of a, b, or c may represent: a, b, c, a and b, a and c, b and c, or a, b, and c, where a, b, and c may be singular or may be plural. In addition, in embodiments of this application, words such as "first" and "second" do not limit a quantity or a sequence.

It should be noted that in this application, the word such as "example" or "for example" is used to represent giving an example, an illustration, or a description. Any embodiment or design solution described as "example" or "for example" in this application should not be explained as being more preferred or having more advantages than another embodiment or design solution. Exactly, use of the word such as "example" or "for example" is intended to present a related concept in a specific manner. In this application, unless otherwise clearly specified and limited, the term "coupling" may be an electrical connection manner for implementing signal transmission, and the "coupling" may be a direct electrical connection, or may be an indirect electrical connection through an intermediate medium.

The light-emitting device driving circuit and the PPG sensor provided in embodiments of this application may be applied to an electronic device. The electronic device is different types of terminals such as a mobile phone, a tablet computer, a personal computer (personal computer, PC), a personal digital assistant (personal digital assistant, PDA), a smartwatch, a netbook, a wearable electronic device, an augmented reality (augmented reality, AR) device, a virtual reality (virtual reality, VR) device, an in-vehicle device, a smart vehicle, a smart acoustic device, a robot, and smart glasses. A specific form of the electronic device is not specifically limited in embodiments of this application.

Figure 1A:
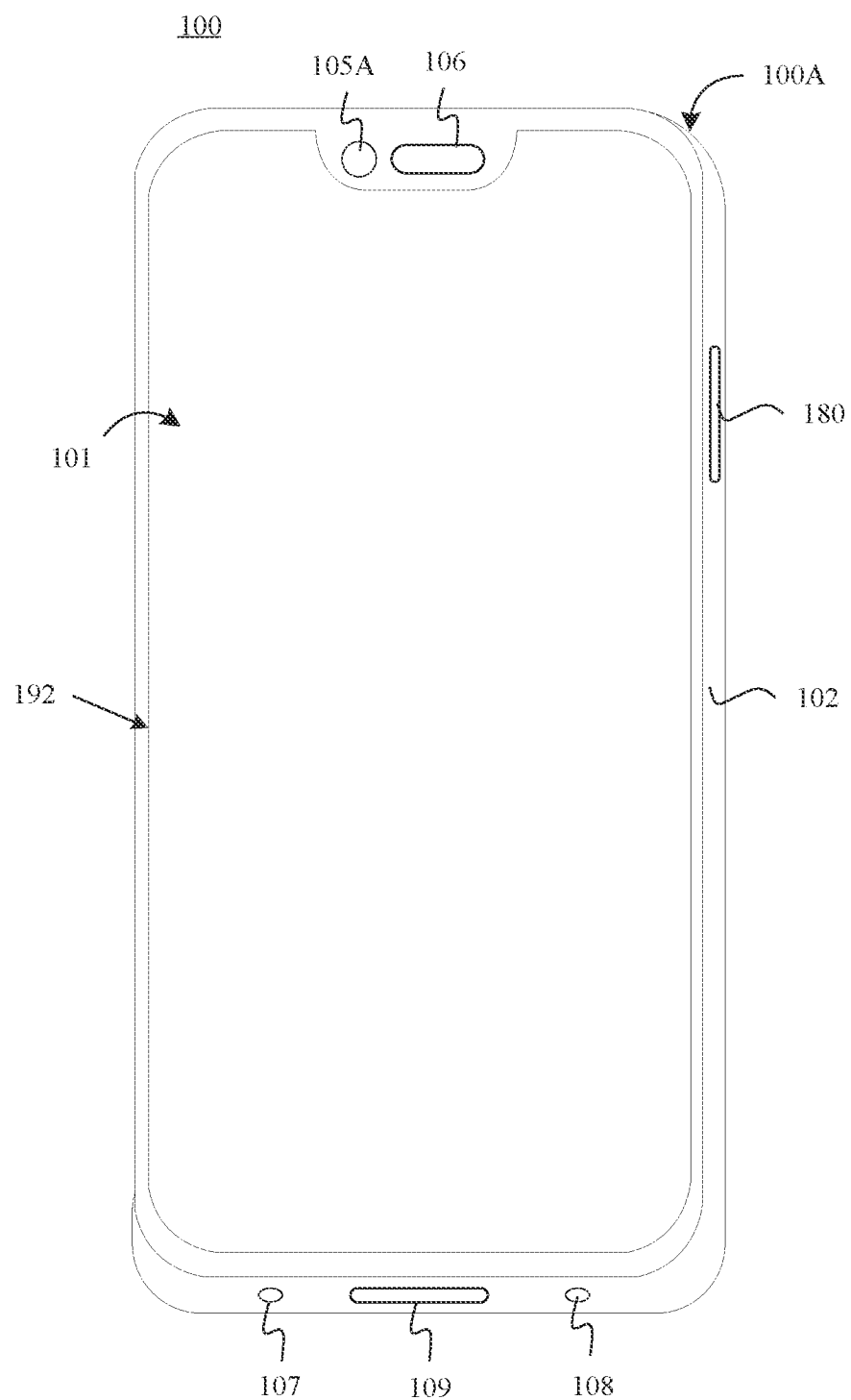
FIG. 1A is a top view of an electronic device according to an embodiment of this application.
Figure 1B:
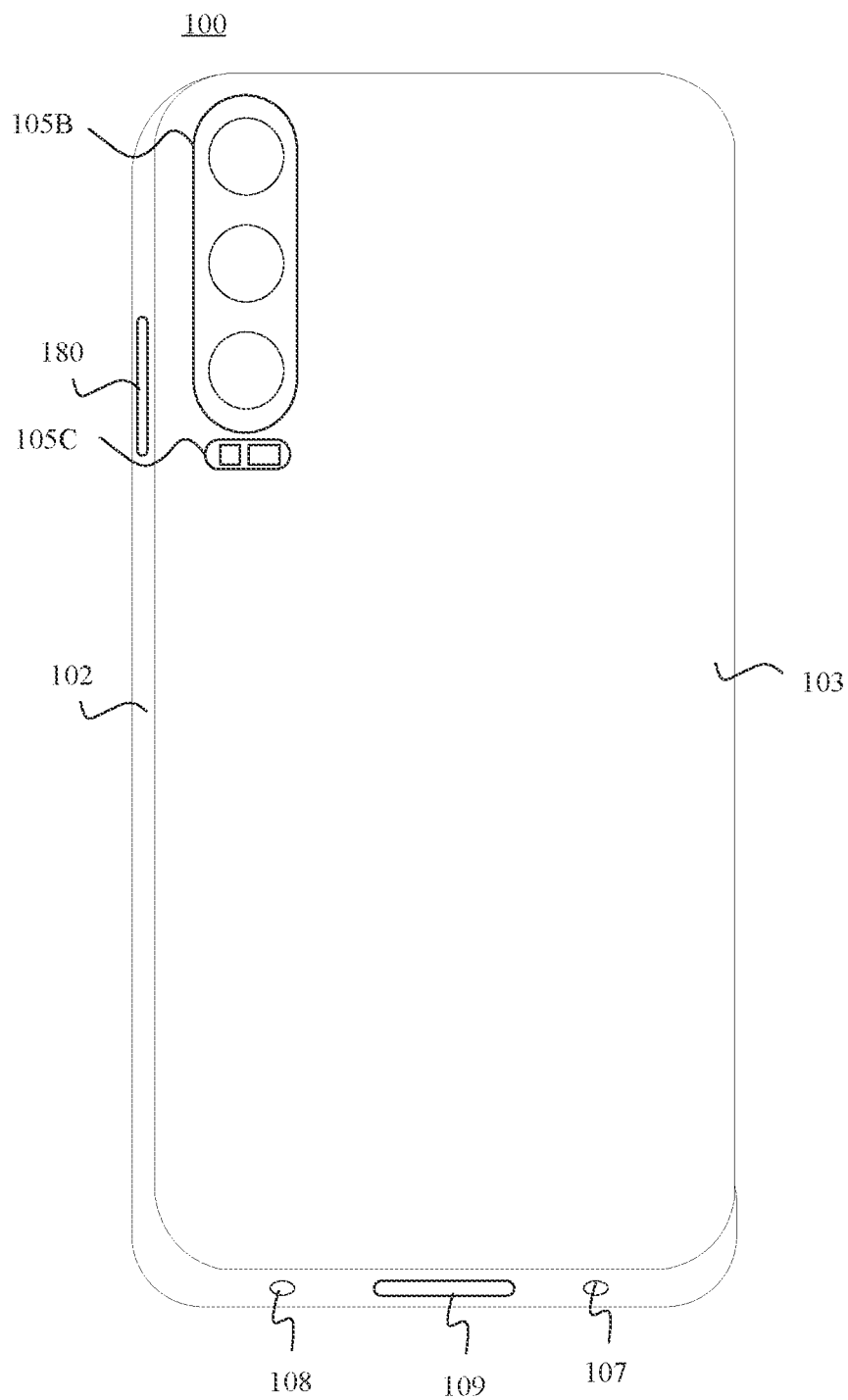
FIG. 1B is a bottom view of an electronic device according to an embodiment of this application.
Figure 1C:
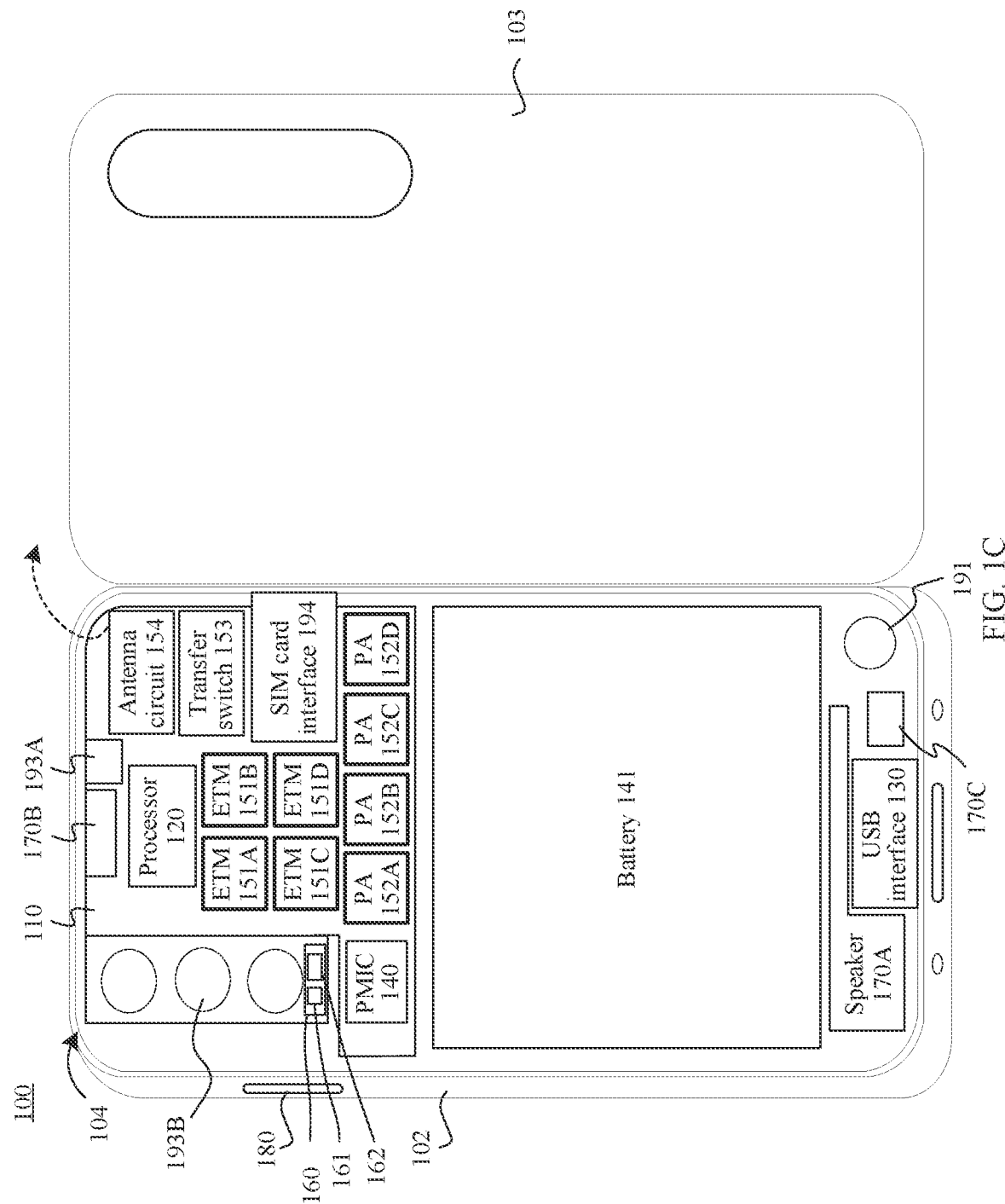
FIG. 1C is a schematic diagram of an internal structure obtained after a rear cover of an electronic device is opened according to an embodiment of this application.

Using a mobile phone as an example, FIG. 1A to FIG. 1C are schematic diagrams of structures of an electronic device 100. FIG. 1A is a top view of the electronic device 100 according to described embodiments, FIG. 1B is a bottom view of the electronic device 100 according to described embodiments, and FIG. 1C is a schematic diagram of an internal structure obtained after a rear cover of the electronic device 100 is opened, and shows a specific configuration of internal components according to described embodiments. A dashed-line arrow in FIG. 1C indicates a direction in which the rear cover is opened. It may be understood that the structure shown in embodiments does not constitute a specific limitation on the electronic device 100. In some other embodiments of this application, the electronic device 100 may include more or fewer components than those shown in the figure, or combine some components, or split some components, or have different component arrangements.

As shown in FIG. 1A and FIG. 1B, the electronic device 100 may include a housing 100A. The housing 100A may include a front cover 101, a rear cover 103, and a frame 102. The front cover 101 and the rear cover 103 are disposed opposite to each other. The frame 102 surrounds the front cover 101 and the rear cover 103, and connects the front cover 101 and the rear cover 103 together. The front cover 101 may be a glass cover, and a display 192 is disposed below the front cover 101. The electronic device 100 may be provided with an input/output component around a periphery of the housing 100A. For example, a hole 105A of a front-facing camera and a hole 106 of a receiver may be disposed on the top of the front cover 101. A button 180 may be disposed on an edge of the frame 102, and a hole 107 of a microphone, a hole 108 of a speaker, and a hole 109 of a USB interface may be disposed on a bottom edge of the frame 102. A hole 105B of a rear-facing camera and a hole 105C of a PPG sensor may be disposed on the top of the rear cover 103.

The housing 100A may have a cavity 104 inside, and internal components are encapsulated in the cavity. As shown in FIG. 1C, the internal components may be accommodated in the cavity 104, and the internal components may include components such as a printed circuit board (Printed circuit board, PCB) 110, a speaker 170A configured to convert an audio electrical signal into a sound signal, a receiver 170B configured to convert an audio electrical signal into a sound signal, a microphone 170C configured to convert a sound signal into an electrical signal, a USB interface 130, a front-facing camera 193A, a rear-facing camera 193B, and a motor 191 configured to generate a vibration prompt. The following components may be disposed on the printed circuit board 110; a processor 120, a power management integrated circuit (power management integrated circuit, PMIC) 140, at least one power amplifier (in an embodiment, the at least one power amplifier includes a power amplifier (power amplifier, PA) 152A, a power amplifier PA 152B, a power amplifier PA 152C, and a power amplifier PA 152D, where different power amplifiers PAs support different frequency bands and are configured to amplify transmit signals on different frequency bands, for example, the power amplifier PA 152A and the power amplifier PA 152B may be configured to amplify a transmit signal in a first bandwidth range, and the power amplifier PA 152C and the power amplifier PA 152D may be configured to amplify a transmit signal in a second bandwidth range), at least one envelope tracking modulator (envelope tracking modulator) ETM (in an embodiment, the at least one envelope tracking modulator includes an envelope tracking modulator ETM 151A and an envelope tracking modulator ETM 151B, where different envelope tracking modulators ETMs support different bandwidths, for example, the envelope tracking modulator ETM 151A supplies power to the power amplifier PA 152A and the power amplifier PA 152B, and the envelope tracking modulator ETM 151B supplies power to the power amplifier PA 152C and the power amplifier PA 152D), a transfer switch 153, an antenna circuit 154, and a PPG sensor 160, where the PPG sensor 160 includes a detector 161 and a light-emitting device driving circuit 162. The detector 161 is configured to detect a test optical signal that is of a light-emitting device of the light-emitting device driving circuit 162 and that is reflected and/or scattered by a detected object. In addition, the printed circuit board 110 may further include components such as a filter, a low noise amplifier, an audio codec, an internal memory, a sensor, an inductor, and a capacitor. To clearly show this embodiment, the filter, the low noise amplifier, the audio codec, the internal memory, the sensor, the inductor, and the capacitor are not shown in FIG. 1C. The components on the printed circuit board 110 are arranged tightly, so that all the components are placed in limited space. An arrangement manner of the components on the printed circuit board 110 is not limited. In some embodiments, the components on the printed circuit board 110 may be disposed on one surface (for example, a surface facing the rear cover 103) of the printed circuit board 110. In some embodiments, the components on the printed circuit board 110 may be disposed on two surfaces of the printed circuit board 110 (for example, the components are separately located a surface facing the rear cover 103 and located on a surface facing the front cover 101).

The processor 120 may include one or more processing units. For example, the processor 120 may include an application processor (application processor, AP), a modem processor, a graphics processing unit (graphics processing unit, GPU), an image signal processor (image signal processor, ISP), a neural-network processing unit (neural-network processing unit, NPU), a controller, a video codec, a digital signal processor (digital signal processor, DSP), a baseband, and/or a radio frequency circuit. The controller may generate an operation control signal based on instruction operation code and a timing signal, to control instruction fetching and instruction execution.

A memory may be disposed in the processor 120, and is configured to store instructions and data. In some embodiments, the memory in the processor 120 includes a cache. The memory may store instructions or data just used or cyclically used by the processor 120. If the processor 120 needs to use the instructions or the data again, the processor 120 may directly invoke the instructions or the data from the memory. This avoids repeated access and reduces waiting time of the processor 120, thereby improving system efficiency.

The processor 120 may perform frequency modulation on a signal based on a mobile communication technology or a wireless communication technology. The mobile communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), an emerging wireless communication technology (which may also be referred to as a 5th generation mobile communication technology, English: 5th generation mobile networks or 5th generation wireless systems, 5th-Generation, or 5th-Generation New Radio, and is referred to as 5G, a 5G technology, or 5G NR for short), and the like. The wireless communication technology may include a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, and the like.

The processor 120 may further include at least one baseband and at least one radio frequency circuit. The baseband is configured to synthesize a baseband signal to be transmitted, or/and is configured to decode a received baseband signal. Specifically, during transmission, the baseband encodes a voice signal or another data signal into a baseband signal (baseband code) for transmission; and during receiving, the baseband decodes a received baseband signal (baseband code) into a voice signal or another data signal. The baseband may include components such as an encoder, a decoder, and a baseband processor. The encoder is configured to synthesize a baseband signal to be transmitted, and the decoder is configured to decode a received baseband signal. The baseband processor may be a microprocessor (MCU). The baseband processor may be configured to control the encoder and the decoder. For example, the baseband processor may be configured to complete scheduling of encoding and decoding, communication between the encoder and the decoder, driving of a peripheral component (the baseband processor may send an enable signal to a component outside the baseband, to enable the component outside the baseband), and the like. The radio frequency circuit is configured to: process a baseband signal to form a transmit (Transmit, TX) signal, and transfer the transmit signal to a power amplifier PA for amplification; and/or the radio frequency circuit is configured to: process a receive (Receive, RX) signal to form a baseband signal, and send the formed baseband signal to the baseband for decoding. In some embodiments, each baseband corresponds to one radio frequency circuit, to perform frequency modulation on a signal based on one or more communication technologies. For example, a first baseband and a first radio frequency circuit perform frequency modulation on a signal based on a 5G technology, a second baseband and a second radio frequency circuit perform frequency modulation on a signal based on a 4G technology, a third baseband and a third radio frequency circuit perform frequency modulation on a signal based on a Wi-Fi technology, a fourth baseband and a fourth radio frequency circuit perform frequency modulation on a signal based on a Bluetooth technology, and so on. Alternatively, the first baseband and the first radio frequency circuit may perform frequency modulation on a signal based on both the 4G technology and the 5G technology, the second baseband and the second radio frequency circuit perform frequency modulation on a signal based on the Wi-Fi technology, and so on. In some embodiments, one baseband may alternatively correspond to a plurality of radio frequency circuits, to improve integration.

In some embodiments, the baseband and the radio frequency circuit may be integrated in an integrated circuit with other components of the processor 120. In some embodiments, the baseband and the radio frequency circuit each may be an independent device independent of the processor 120. In some embodiments, one baseband and one radio frequency circuit may be integrated in a device that is independent of the processor 120.

In the processor 120, different processing units may be independent devices, or may be integrated in one or more integrated circuits.

The antenna circuit 154 is configured to transmit and receive an electromagnetic wave signal (a radio frequency signal). The antenna circuit 154 may include a plurality of antennas or a plurality of groups of antennas (the plurality of groups of antennas include more than two antennas), and each antenna or the plurality of groups of antennas may be configured to cover one or more communication frequency bands. The plurality of antennas may be one or more of a multi-frequency antenna, an array antenna, or an on-chip (on-chip) antenna.

The processor 120 is coupled to the antenna circuit 154, to implement various functions associated with transmitting and receiving of a radio frequency signal. For example, when the electronic device 100 transmits a signal, the baseband synthesizes to-be-transmitted data (digital signals) into a to-be-transmitted baseband signal. The baseband signal is converted into a transmit signal (a radio frequency signal) by the radio frequency circuit. The transmit signal is amplified by the power amplifier. An amplified output signal that is output by the power amplifier is transferred to the transfer switch 153, and is transmitted by using the antenna circuit 154. A path through which the transmit signal is sent from the processor 120 to the transfer switch 153 is a transmit link (or referred to as a transmit path). When the electronic device 100 needs to receive a signal, the antenna circuit 154 sends a receive signal (a radio frequency signal) to the transfer switch 153, the transfer switch 153 sends the radio frequency signal to the radio frequency circuit, the radio frequency circuit processes the radio frequency signal into a baseband signal, and the radio frequency circuit converts the processed baseband signal into data and then sends the data to a corresponding application processor. A path through which the radio frequency signal is sent from the transfer switch 153 to the processor 120 is a receive link (or referred to as a receive path).

The transfer switch 153 may be configured to selectively connect the antenna circuit 154 to the transmit link or the receive link electrically. In some embodiments, the transfer switch 153 may include a plurality of switches. The transfer switch 153 may be further configured to provide an additional function, including signal filtering and/or duplexing (duplexing).

A SIM card interface 194 is configured to connect to a SIM card. The SIM card may be inserted into the SIM card interface 194 or removed from the SIM card interface 194, to implement contact with or separation from the electronic device 100. The electronic device 100 may support one or N SIM card interfaces, where N is a positive integer greater than 1. The SIM card interface 194 may support a nano-SIM card, a micro-SIM card, a SIM card, and the like. A plurality of cards may be simultaneously inserted into a same SIM card interface 194. The plurality of cards may be of a same type or different types. Each SIM card may support one or more communication standards, and each communication standard has a specified frequency band and specifies a different maximum bandwidth. The SIM card interface 194 may also be compatible with different types of SIM cards. The SIM card interface 194 may also be compatible with an external storage card. The electronic device 100 interacts with a network through the SIM card, to implement functions such as call making/answering and data communication. In some embodiments, the electronic device 100 uses an eSIM, that is, an embedded SIM card. The eSIM card may be embedded in the electronic device 100, and cannot be separated from the electronic device 100.

The PMIC 140 is configured to manage a power supply in the electronic device 100. For example, the PMIC 140 may include a charging management circuit and a power supply management circuit. The charging management circuit is configured to receive charging input from a charger. For example, in some wired charging embodiments, the charging management circuit may receive charging input from a wired charger by using the USB interface 130. The power supply management circuit is configured to receive input of the battery 141 and/or input of the charging management circuit, and supply power to components such as the processor 120, the display 192, the front-facing camera 193A, the rear-facing camera 193B, and the motor 191. In some other embodiments, the charging management circuit and the power supply management circuit may alternatively be disposed in the processor 120. In some other embodiments, the charging management circuit and the power supply management circuit may alternatively be disposed in different devices.

Figure 2:
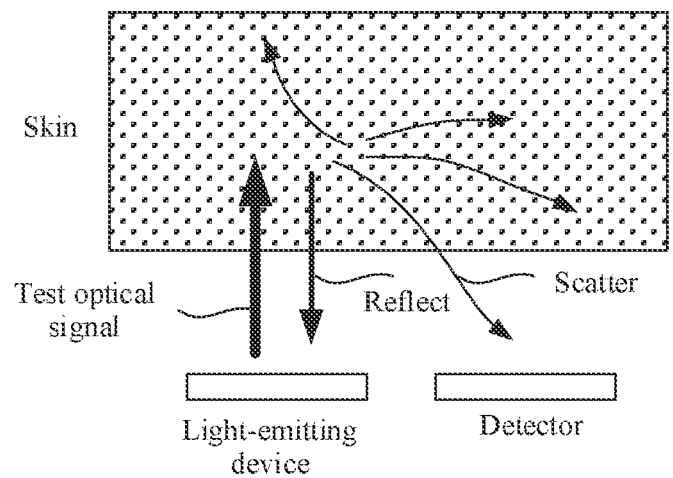
FIG. 2 is a schematic diagram of a working principle of a PPG sensor according to an embodiment of this application.

Specifically, the light-emitting device driving circuit provided in this embodiment of this application includes at least one light-emitting device. The light-emitting device may be used in a backlight module of the display 192, or the light-emitting device may be used in the PPG sensor. The backlight module is mainly configured to provide displayed backlight for the display 192. With reference to FIG. 2, a basic principle of the PPG sensor is as follows: The light-emitting device transmits a test optical signal. A part of the test optical signal is transmitted on a detected object (for example, inside skin or in a skin interface), and a part of the test optical signal is scattered on the detected object (for example, inside skin). A part of the scattered signal returns to the PPG sensor and is received by the detector of the PPG sensor, and the part of scattered signal is referred to as a backscattered signal. In addition to receiving a part of the scattered signal, the detector further receives a part of the reflected signal.

Generally, light emitted by the backlight module or the PPG sensor is usually implemented by using a plurality of wavelengths. Generally, each wavelength corresponds to one light-emitting device (for example, a laser diode (laser diode, LD), a light-emitting diode (light-emitting diode, LED), an organic light-emitting diode (organic light-emitting diode, OLED), or a vertical-cavity surface-emitting laser (vertical-cavity surface-emitting laser, VCSEL)). Certainly, a light-emitting device may also emit light of different wavelengths at different currents. The PPG sensor is used as an example. Generally, the PPG sensor on a wearable product uses three wavelengths: green (green) light, red (red) light, and infrared (infrared radiation, IR) light. A center wavelength of a green light-emitting device is usually 530 nm, a center wavelength of a red light-emitting device is usually 670 nm, and a center wavelength of an infrared light-emitting device is usually 850 nm, 900 nm, or 940 nm. Light-emitting devices with different center wavelengths are manufactured by using different materials, and processes are also different. Therefore, when a current flows through light-emitting devices with different center wavelengths, voltage drops generated on the light-emitting devices are different. The voltage drop is a forward voltage drop (Forward Voltage, VF for short) of the light-emitting device.

Figure 3:
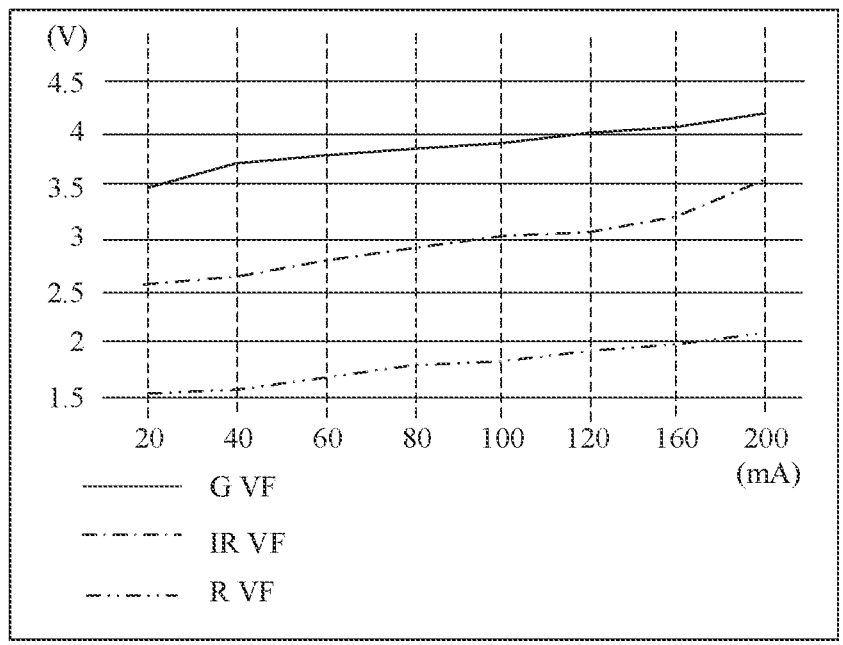
FIG. 3 is a schematic curve diagram of a relationship between a VF and a current according to an embodiment of this application.
Figure 4:
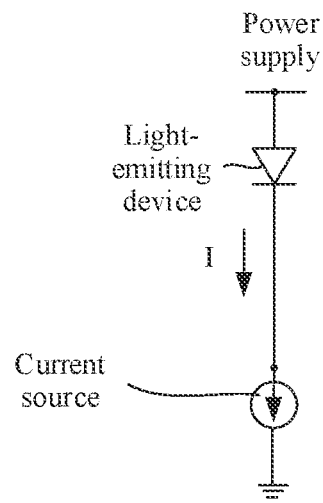
FIG. 4 is a schematic diagram of a power supply manner of a light-emitting device according to an embodiment of this application.

FIG. 3 is a diagram of a relationship between a current (mA) and a VF (V) of a light-emitting device (using an LED as an example) with three colors (G, R, and IR) or between a current (mA) and VFs (V) of light-emitting devices with three colors. With reference to FIG. 4, in an electronic device, a power supply is usually used to provide a fixed voltage for a light-emitting device, and a current source controls a current I flowing through the light-emitting device to control luminous intensity of the light-emitting device. Generally, the luminous intensity of the light-emitting device increases when the current I flowing through the light-emitting device is increased, and the luminous intensity of the light-emitting device decreases when the current I flowing through the light-emitting device is decreased. Because internal resistance exists inside the light-emitting device, when the current flowing through the light-emitting device changes, a VF on the light-emitting device also changes. For example, assuming that the internal resistance of the light-emitting device is 10 ohms, when a 10 mA current flows through the light-emitting device, a 0.1 V voltage drop is formed between an anode and a cathode of the light-emitting device; and when a 100 mA current flows through the light-emitting device, a 1 V voltage drop is formed between the anode and the cathode of the light-emitting device. Therefore, VFs of light-emitting devices of different colors (different wavelengths) are different, and VFs of a light-emitting device of a same color (wavelength) are different when different currents flow through the light-emitting device. In addition, the VF usually increases as the current increases.

Figure 5:
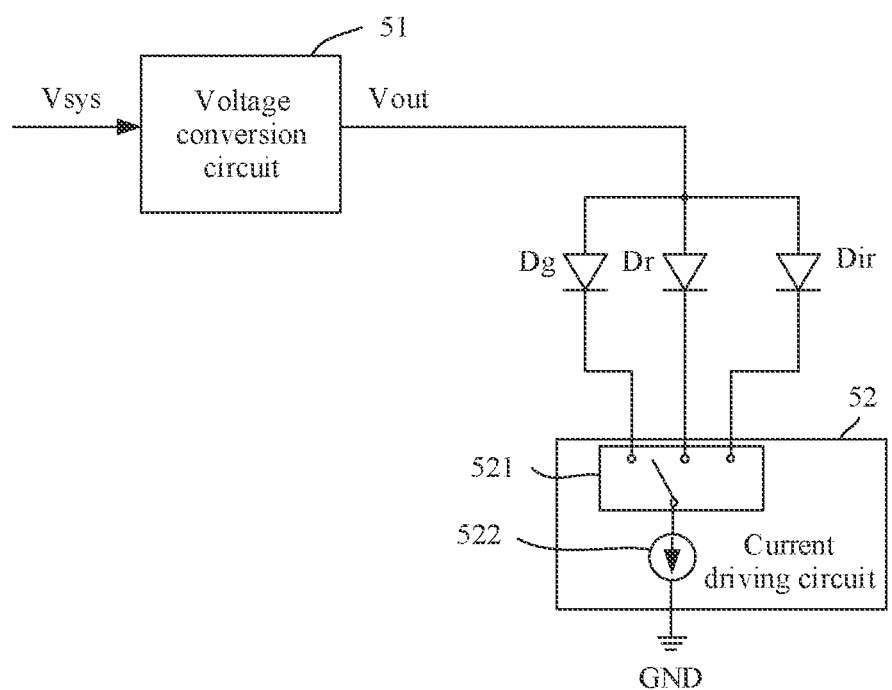
FIG. 5 is a schematic diagram of a structure of a light-emitting device driving circuit according to an embodiment of this application.
Figure 6:
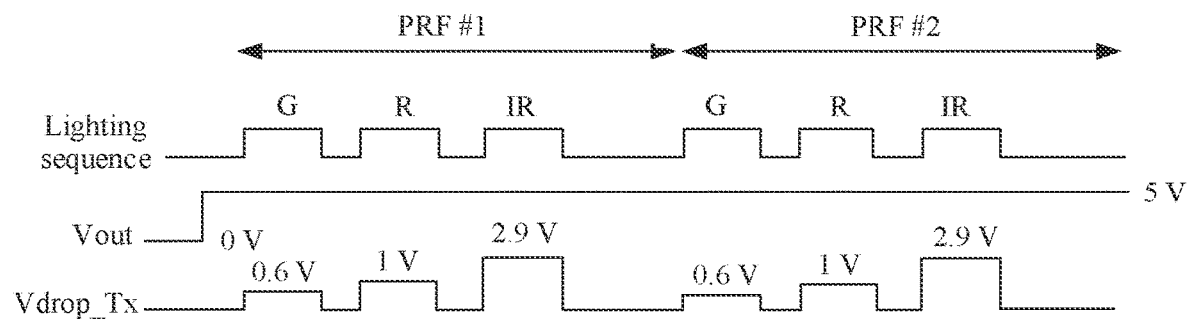
FIG. 6 is a signal sequence diagram of a light-emitting device driving circuit according to an embodiment of this application.

LEDs (Dg, Dr, and Dir, where Dg is a green LED, Dr is a red LED, and Dir is an infrared LED) are used as examples. Generally, in a PPG sensor or a backlight module, a power supply manner and a driving manner shown in FIG. 5 are usually used for the LEDs. A system voltage (Vsys) is input to an input terminal of a voltage conversion circuit 51 (for example, the voltage conversion circuit 51 may be a boost (boost) circuit or a buck-boost (buck-boost) circuit), and an output terminal Vout supplies power to one or more LEDs (Dg, Dr, Dir) with different wavelengths (for example, the output terminal is connected to anodes (Anodes) of the LEDs). Cathodes of the LEDs (Dg, Dr, and Dir) are connected to a current driving circuit 52 (Tx driver), and the current driving circuit 52 usually includes a current source 522 and a transfer switch circuit 521. When the current source 522 is connected to a cathode (cathode) of an LED (for example, may be one of Dg, Dr, and Dir) by using the transfer switch circuit 521, a current flows through the connected LED and the connected LED emits light. A magnitude of a current provided by the current source 522 and on or off of the transfer switch circuit 521 are controlled by respective control signals. To enable all LEDs (Dg, Dr, and Dir) to work normally at a maximum current, a voltage output by the voltage conversion circuit 51 needs to be set to a voltage that enables an LED with a maximum VF to work at the maximum current. For example, a voltage drop of the current source 522 at the maximum current is $Vhr\_max=0.6$ V, the maximum current is $Imax=200$ mA, and maximum voltage drops of the three LEDs Dg, Dr, and Dir at Imax are respectively $VF\_Gmax=4.3$ V, $VF\_Rmax=3.9$ V, and $VF\_IRmax=2.0$ V. In this case, an output voltage of the voltage conversion circuit 51 needs to be fixed at $Vout=Vhr\_max+maxim\{VF\_Gmax, VF\_Rmax, VF\_IRmax\}+Vmargin=5.0$ V (Vmargin is an engineering margin, which may be 0, and is set to 0.1 V herein). When the LED works, a voltage drop (a voltage drop of the current driving circuit 52, or a voltage from the cathode of the LED to a negative terminal of the current source 522, where the negative terminal of the current source 522 in FIG. 5 is connected to a ground terminal GND, and the voltage is 0 V) of the current source 522 is Vdrop_tx=Vout-{VF_G, VF_R, VF_Ir}. If the output terminal Vout of the voltage conversion circuit 51 supplies power with 5 V, when Dg works at 200 mA, a voltage drop of the current source 522 is Vdrop_tx=0.6 V (without considering the engineering margin), which exactly meets a voltage (that is, a voltage headroom or a headroom voltage) for normal working of the current source 522. However, when Dr or Dir works, because VFs of Dr and Dir are lower than a VF of Dg, when Dr and Dir work, voltage drops Vdrop_tx of the current source 522 are respectively 1 V and 2.9 V, as shown in FIG. 6. During a pulse repetition frequency (pulse repetition frequency, PRF, for example, a PRF #1 or a PRF #2 in the figure) of a lighting sequence of the LEDs, when Dr and Dir work, Vdrop_tx of the current source 522 is far greater than the required headroom voltage of 0.6 V, and compared with Dg, an increase generated in Vdrop_tx during lighting of Dr and Dir is a power consumption waste. When Dr and Dir work at 200 mA, additionally wasted voltage drops are respectively 0.4 V and 2.3 V, which respectively account for 8% and 46% of the 5 V output voltage of the voltage conversion circuit 51. Generally, working currents of LEDs with three wavelengths G, R, and IR are far less than 200 mA. In this case, when Dg works, an additional voltage drop is also caused to the current driving circuit 52. For example, a smaller working current indicates a higher proportion of an additionally wasted voltage drop. In conclusion, to be compatible with a maximum current working scenario of an LED with a plurality of wavelengths or be compatible with working scenarios of an LED with a single wavelength work at different currents, when an LED of a PPG sensor is powered by the voltage conversion circuit 51, the voltage conversion circuit 51 outputs a fixed maximum voltage, to meet a normal working requirement in an extreme (maximum current) scenario. For an LED with a low VF, or when the LED works in a non-maximum current working scenario, if the voltage conversion circuit 51 outputs the fixed maximum voltage, a great waste is generated and a battery life of the electronic device is shortened.

Figure 7:
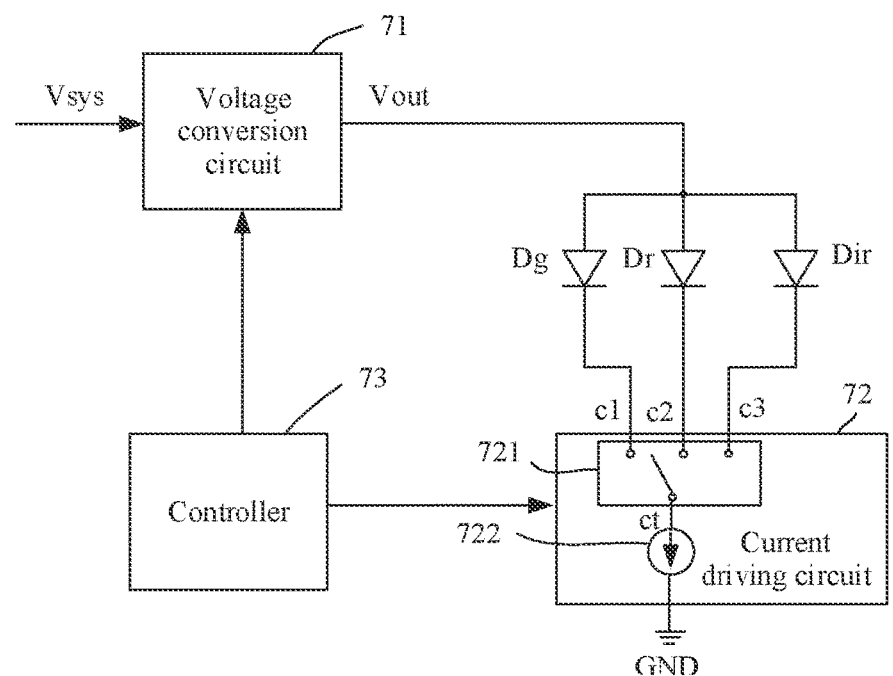
FIG. 7 is a schematic diagram of a structure of a light-emitting device driving circuit according to another embodiment of this application.
Figure 8:
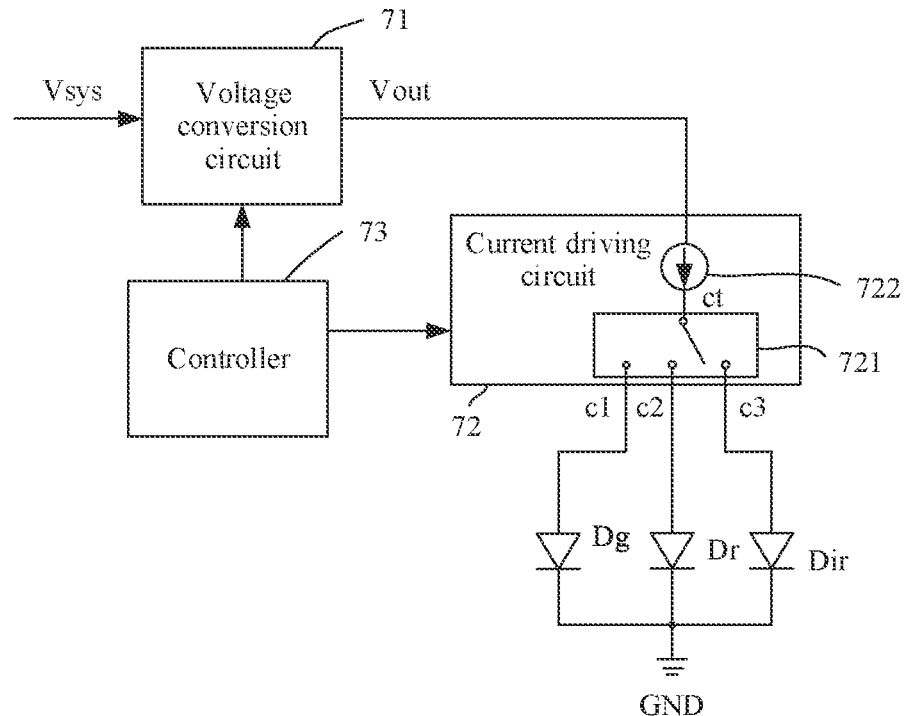
FIG. 8 is a schematic diagram of a structure of a light-emitting device driving circuit according to still another embodiment of this application.

To resolve the foregoing problems, an embodiment of this application provides a light-emitting device driving circuit. As shown in FIG. 7 and FIG. 8, the light-emitting device driving circuit includes a voltage conversion circuit 71, at least one light-emitting device (Dg, Dr, and Dir), a current driving circuit 72, and a controller 73. Any light-emitting device (Dg, Dr, and Dir) and the current driving circuit 72 are connected in series between an output terminal Vout and a ground terminal GND of the voltage conversion circuit 71. It should be noted that, a series relationship between the light-emitting device and the current driving circuit 72 is not limited in this embodiment of this application. For example, as shown in FIG. 7, one terminal of any light-emitting device (Dg, Dr, and Dir) is connected to the output terminal of the voltage conversion circuit 71, the other terminal of the any light-emitting device is connected to one terminal of the current driving circuit 72, and the other terminal of the current driving circuit 72 is connected to the ground terminal GND. In FIG. 8, one terminal of the current driving circuit 72 is connected to the output terminal of one terminal of the voltage conversion circuit 71, the other terminal of the current driving circuit 72 is connected to one terminal of any light-emitting device (Dg, Dr, and Dir), and the other terminal of the any light-emitting device (Dg, Dr, and Dir) is connected to the ground terminal GND. For example, the light-emitting device is an LED. In the example in FIG. 7, an anode of the LED is connected to the output terminal of the voltage conversion circuit 71, and a cathode of the LED is connected to the current driving circuit 72. In the example in FIG. 8, the anode of the LED is connected to the current driving circuit 72, and the cathode of the LED is connected to the ground terminal GND.

The controller 73 is configured to output a first control signal to the current driving circuit 72, the current driving circuit 72 is configured to provide a predetermined current for a first light-emitting device (one of Dg, Dr, and Dir) based on the first control signal, the controller 73 is configured to output a second control signal to the voltage conversion circuit 71 based on an electrical parameter on a path on which the first light-emitting device and the current driving circuit 72 are located, and the voltage conversion circuit 71 is configured to adjust a voltage at the output terminal of the voltage conversion circuit 71 based on the second control signal.

In this way, when the controller controls, by using the first control signal, the current driving circuit to output the predetermined current to the first light-emitting device in the at least one light-emitting device, the controller may output the second control signal to the voltage conversion circuit based on the electrical parameter on the path on which the first light-emitting device and the current driving circuit are located. Therefore, the voltage conversion circuit can adjust the voltage at the output terminal in real time based on the second control signal, and no longer supplies power to all light-emitting devices with a maximum fixed voltage to enable the light-emitting devices to work in an extreme (maximum current) scenario, thereby improving power supply efficiency of the light-emitting device, and reducing power consumption of an entire system.

For example, as shown in FIG. 7 or FIG. 8, the current driving circuit 72 includes a current source 722 and a transfer switch circuit 721, a common terminal ct of the transfer switch circuit 721 is coupled to the current source 722, and any light-emitting device (Dg, Dr, and Dir) is coupled to any selection terminal of the transfer switch circuit 721 (as shown in FIG. 7 or FIG. 8, the transfer switch circuit 721 includes three selection terminals c1, c2, and c3, where the light-emitting device Dg is coupled to the selection terminal c1, the light-emitting device Dr is coupled to the selection terminal c2, and the light-emitting device Dir is coupled to the selection terminal c3). The first control signal includes a switch control signal and a current control signal. The transfer switch circuit 721 is configured to connect, based on the switch control signal, the common terminal ct and a selection terminal coupled to the first light-emitting device, to couple the current source 722 to the first light-emitting device. For example, when the common terminal ct and the selection terminal c1 are connected, the current source 722 is coupled to the light-emitting device Dg. The switch control signal is synchronous with a lighting sequence of the first light-emitting device, to be specific, the first light-emitting device is lighted when the switch control signal controls the current source 722 to be coupled to the first light-emitting device. The current source 722 is configured to provide the predetermined current for the first light-emitting device based on the current control signal. In addition, the first control signal and the second control signal corresponding to the same first light-emitting device need to be processed synchronously. For example, the second control signal controls the voltage conversion circuit 71 only when the first control signal controls the current driving circuit 72 to drive the first light-emitting device to be lighted, or before the first control signal controls the current driving circuit 72 to drive the first light-emitting device to be lighted, or after a moment at which the first control signal controls the current driving circuit 72 to drive the first light-emitting device to be lighted, where advanced or lagged (delayed) time may be configured randomly.

Figure 9:
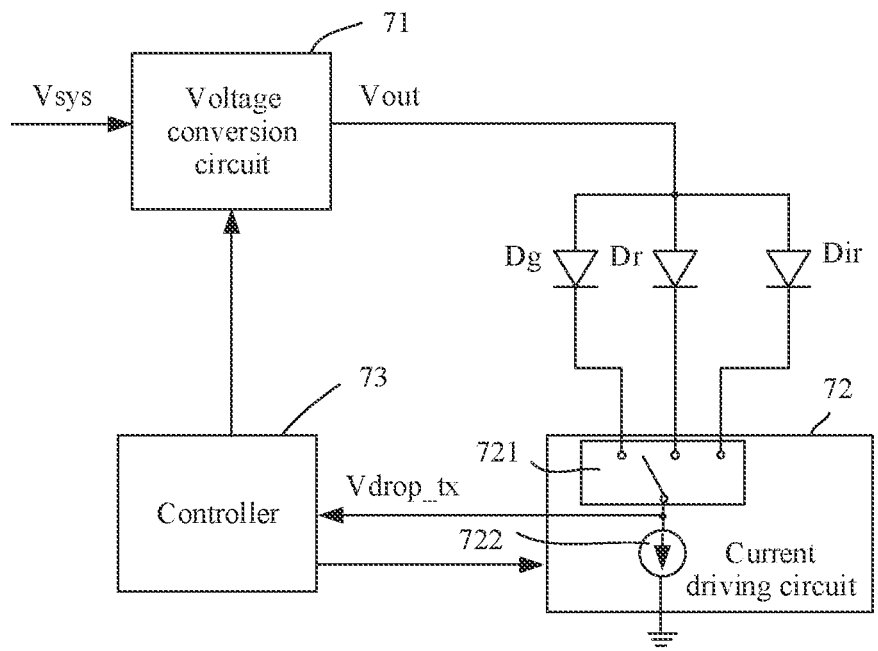
FIG. 9 is a schematic diagram of a structure of a light-emitting device driving circuit according to yet another embodiment of this application.

In a specific implementation, as shown in FIG. 9, a voltage drop (a voltage drop of a Tx driver) or a headroom voltage of the current source 722 may be used to implement automatic voltage adjustment of the voltage conversion circuit 71. In this case, the electrical parameter includes the voltage drop of the current source 722. The controller 73 is configured to detect the voltage drop of the current source 722, and output the second control signal to the voltage conversion circuit 71 based on the voltage drop of the current source 722, where when the voltage drop of the current source 722 is greater than a specified threshold, the second control signal is used to control the voltage conversion circuit 71 to decrease the voltage at the output terminal; or when the voltage drop of the current source 722 is less than the specified threshold, the second control signal is used to control the voltage conversion circuit 71 to increase the voltage at the output terminal. For example, if the voltage drop or the headroom voltage of the Tx driver is greater than the specified threshold (for example, 0.7 V), an output voltage of the voltage conversion circuit 71 is decreased; or if the voltage drop or the headroom voltage of the Tx driver is less than the specified threshold (for example, 0.7 V), the output voltage of the voltage conversion circuit 71 is increased. In this way, an additional voltage drop or headroom voltage of the Tx driver is decreased, thereby reducing power consumption of a system. However, in this example, the voltage drop of the current source 722 needs to be first obtained, and then the second control signal can be output to the voltage conversion circuit 71 based on the voltage drop of the current source 722. Therefore, a sequence of the first control signal should be earlier than that of the second control signal, and after the first control signal controls the current driving circuit 72 to drive the LED to be lighted, the second control signal performs voltage adjustment control on the voltage conversion circuit 71.

Optionally, the second control signal may directly include the voltage drop (the voltage drop Vdrop_tx of the Tx driver) or the headroom voltage of the current source 722. To be specific, the controller 73 may directly output the voltage drop Vdrop_tx or the headroom voltage of the current source 722 to the voltage conversion circuit 71, and control the output voltage of the voltage conversion circuit 71 based on the voltage drop of the current source 722. In this case, the voltage conversion circuit 71 has a function of receiving a voltage control signal (that is, the second control signal), and may further have a function of adjusting the specified threshold. When an input voltage drop of the current source 722 is less than the specified threshold, the output voltage of the voltage conversion circuit 71 is increased; or when an input voltage drop of the current source 722 is greater than the specified threshold, the output voltage of the voltage conversion circuit 71 is decreased. Through such negative feedback, the output voltage of the voltage conversion circuit 71 is adjusted and stabilized. In addition, the voltage conversion circuit 71 may adjust the specified threshold in a form of hardware (for example, in a form of resistance voltage division) or software (for example, in a form of an I2C (inter-integrated circuit, inter-integrated circuit) interface configuration register).

In another specific implementation, with reference to FIG. 7 or FIG. 8, the electrical parameter includes a driving current of the first light-emitting device, and the controller 73 is configured to output the second control signal to the voltage conversion circuit 71 based on the driving current of the first light-emitting device. The driving current of the first light-emitting device may be used to implement automatic voltage adjustment of the voltage conversion circuit 71. In this case, the electrical parameter includes the driving current of the first light-emitting device. For example, if a current of the current source 722 increases or the driving current of the first light-emitting device (certainly, on a series circuit, the current of the current source 722 is equal to the driving current of the first light-emitting device) increases, the output voltage of the voltage conversion circuit 71 is increased; or if the current of the current source 722 increases or the driving current of the first light-emitting device decreases, the output voltage of the voltage conversion circuit 71 is decreased. In this way, an additional voltage drop or headroom voltage of the current source 722 is decreased, thereby reducing power consumption of a system.

Specifically, the controller 73 is specifically configured to query, based on a lookup table, an expected voltage value corresponding to the driving current of the first light-emitting device, and output the second control signal to the voltage conversion circuit 71 based on the expected voltage value, where the second control signal is used to control the voltage conversion circuit to output the expected voltage value at the output terminal.

Refer to the lookup table shown in Table 1. It is assumed that Dg, Dr, and Dir are lighted in sequence, and driving currents of Dg, Dr, and Dir are respectively 100 mA, 50 mA, and 200 mA during lighting. In this case, when, before, or after first control signals corresponding to Dg, Dr, and Dir control Dg, Dr, and Dir to be lighted, a first row, a second row, and a third row in Table 1 are respectively searched to learn that expected voltage values that should be output by the voltage conversion circuit 71 are respectively 4.6 V, 3.4 V, and 2.8 V, and the voltage conversion circuit 71 is controlled based on this to output 4.6 V, 3.4 V, and 2.8 V. The lookup table may be stored in the voltage conversion circuit 71, or may be stored in the controller 73; or may be set in dedicated storage space (for example, a memory of an electronic device) independent of the controller 73, and operated by the controller 73 (for example, the controller 73 queries, based on the driving current of the first light-emitting device and a type of the light-emitting device, the lookup table stored in the storage space, to obtain the expected voltage value). If the lookup table is stored in the voltage conversion circuit 71, the controller 73 may first query the lookup table to obtain the expected voltage value, and then output the second control signal to the voltage conversion circuit 71, to control the voltage conversion circuit 71 to output the expected voltage value; or the controller 73 outputs the driving current of the first light-emitting device and a type (which may be included in the second control signal) of the light-emitting device to the voltage conversion circuit 71, and the voltage conversion circuit 71 queries the lookup table based on the driving current of the first light-emitting device and the type of the light-emitting device to obtain the expected voltage value, and adjust the output voltage to the expected voltage value. The controller 73 may directly control, by using a control interface, the voltage conversion circuit 71 to output the expected voltage value, or may control, by using software (for example, an I2C interface configuration register), the voltage conversion circuit 71 to output the expected voltage value.

TABLE 1

| Type | current of the LED | | |
|---|---|---|---|
| | 50 mA | 100 mA | 200 mA |
| LED 1 (G) | 4.4 | 4.6 | 5 |
| LED 2 (R) | 3.4 | 3.7 | 4.2 |
| LED 3 (IR) | 2.2 | 2.6 | 2.8 |

In another manner, the controller 73 is specifically configured to: calculate, based on a specified formula, an expected voltage value corresponding to the driving current of the first light-emitting device, and output the second control signal to the voltage conversion circuit based on the expected voltage value, where the second control signal is used to control the voltage conversion circuit to output the expected voltage value at the output terminal.

Specifically, the expected voltage value output by the voltage conversion circuit 71 may be obtained by setting a formula. For example, a relationship between the expected voltage value and the driving current of the first light-emitting device may be described by using a linear polynomial or a quadratic polynomial, for example, $Vout(i)=b(i)*I_{led}(i)+c(i)$, where i is used to represent light-emitting devices of different colors (for example, G, R, and IR), b(i) and c(i) are coefficients in the polynomial of degree 1 with one variable, and $I_{led}(i)$ represents the driving current of the light-emitting device; or $Vout(i)=a(i)*I_{led}(i)*I_{led}(i)+b(i)*I_{led}(i)+c(i)$, where a(i), b(i), and c(i) are coefficients in the polynomial of degree 2 with one variable.

Using a linear polynomial as an example, $Vout\_green=0.00444*I_{led\_Green}+3.41$, $Vout\_red=0.005*I_{led\_Red}+2.5$, and $Vout\_ir=0.00333*I_{led\_IR}+1.43$.

It should be noted that, if the calculated Vout(i) is only a VF of the LED, the expected voltage value output by the voltage conversion circuit 71 needs to be equal to Vout(i) plus the voltage drop of the current source 722. If the voltage drop of the current source 722 is considered in the specified formula, that is, c(i) already includes the voltage drop of the current source 722, Vout(i) is directly used as the expected voltage value output by the voltage conversion circuit 71.

A specified formula that can indicate a relationship between each light-emitting device or a driving current of each light-emitting device and an expected voltage value may be stored in the voltage conversion circuit 71, the controller 73, or dedicated storage space (for example, the memory of the electronic device). When a light-emitting device needs to be lighted, a specified formula corresponding to the light-emitting device is obtained based on a driving current of the light-emitting device and a type of the light-emitting device, and then the expected voltage value Vout(i) output by the voltage conversion circuit 71 is calculated based on the driving current of the light-emitting device and the specified formula. The controller 73 may complete calculation of Vout(i), and then output the corresponding second control signal to the voltage conversion circuit 71, to control the voltage conversion circuit 71 to adjust the output voltage based on Vout(i). Vout(i) may alternatively be calculated in the voltage conversion circuit 71. The controller 73 provides the driving current of the light-emitting device and the type of the light-emitting device to the voltage conversion circuit 71 by using the second control signal. The voltage conversion circuit 71 obtains Vout(i) through calculation based on the specified formula, and then adjusts the output voltage based on Vout(i).

Figure 10:
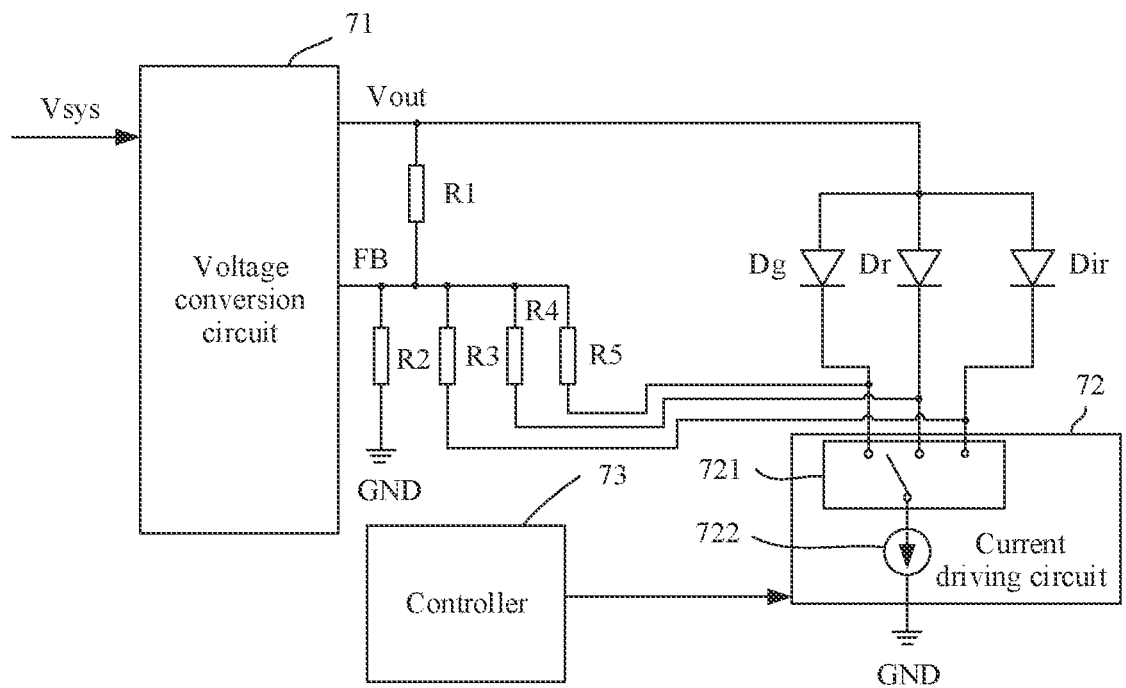
FIG. 10 is a schematic diagram of a structure of a light-emitting device driving circuit according to another embodiment of this application.

In another example, as shown in FIG. 10, an embodiment of this application provides a light-emitting device driving circuit, including: a voltage conversion circuit 71, at least one light-emitting device (Dg, Dr, and Dir), a current driving circuit 72, and a controller 73. The voltage conversion circuit 71 includes a feedback terminal FB and an output terminal Vout, a first resistor R1 and a second resistor R2 are connected in series between the output terminal Vout and a ground terminal GND, and a point that connects the first resistor R1 and the second resistor R2 is coupled to the feedback terminal FB. A first light-emitting device (one of Dg, Dr, and Dir) is connected in series between the output terminal Vout and the current driving circuit 72. A third resistor is coupled between the feedback terminal FB and a point that connects the first light-emitting device (one of Dg, Dr, and Dir) and the current driving circuit 72. For example, FIG. 10 shows three light-emitting devices Dg, Dr, and Dir. A resistor R5 is coupled between the feedback terminal FB and a point that connects Dg and the current driving circuit 72, a resistor R4 is coupled between the feedback terminal FB and a point that connects Dr and the current driving circuit 72, and a resistor R3 is coupled between the feedback terminal FB and a point that connects Dir and the current driving circuit 72.

The controller 73 is configured to output a first control signal to the current driving circuit 72. The current driving circuit 72 is configured to provide a predetermined current for the first light-emitting device based on the first control signal. The voltage conversion circuit 71 is configured to: when determining that a first voltage at the feedback terminal FB is greater than a predetermined voltage value, control to decrease a voltage at the output terminal Vout; or when determining that a second voltage at the feedback terminal FB is less than the predetermined voltage value, control to increase the voltage at the output terminal Vout.

Specifically, with reference to FIG. 10, when R3, R4, and R5 are not disposed, an output voltage Vout of the voltage conversion circuit 71 is determined by R1 and R2, that is, $Vout=Vref*(R1+R2)/R2$, where Vref is a reference comparison voltage inside the feedback terminal (feedback, FB). A working principle of the voltage conversion circuit 71 is as follows: When a voltage at the feedback terminal FB is greater than Vref, the voltage conversion circuit 71 decreases the output voltage at Vout; or when the voltage at the feedback terminal FB is less than Vref, the voltage conversion circuit 71 increases the output voltage at Vout. Through such feedback control, the voltage at the feedback terminal FB is finally stabilized at Vref, that is, the voltage at the output terminal Vout of the voltage conversion circuit 71 is stabilized at $Vref*(R1+R2)/R2$. In this way, a resistor may be connected from one terminal (a cathode of an LED) of each light-emitting device to the feedback terminal FB of the voltage conversion circuit 71, to implement automatic adjustment of the voltage at the output terminal Vout of the voltage conversion circuit 71. A specific process is as follows (it is assumed that a driving current of each light-emitting device is fixed). After the voltage conversion circuit 71 is started, when no current flows through the light-emitting device, the output voltage at Vout is $Vref*(R1+R2)/R2$ (actually, a weak current flows through the LED, which causes a change in the output voltage, but does not affect process analysis). The predetermined current is output after the current driving circuit 72 is turned on, and a voltage flows through the selected first light-emitting device, to form a voltage drop on the current driving circuit 72. If the voltage drop of the current driving circuit 72 increases, the voltage at the feedback terminal FB is increased. When the first voltage at the feedback terminal FB is greater than the predetermined voltage value, the voltage conversion circuit 71 decreases the output voltage at Vout. After the output voltage at Vout of the voltage conversion circuit 71 decreases, because a voltage drop of the first light-emitting device remains unchanged, the voltage drop of the current driving circuit 72 is decreased, causing a decrease in the voltage at the feedback terminal FB. Finally, the voltage at the feedback terminal FB is kept in a critical state of Vref. Finally, the voltage at the output terminal Vout of the voltage conversion circuit 71 is Vout=Vref*[1/Rx+1/R2+1/R1] * R1−Vdrop_tx*R1/Rx, where Rx is resistors that connect FB to cathodes of Dg, Dr, and Dir, that is, R3, R4, and R5 in FIG. 10.

For example, R1=3 Mohm, R2=800 Kohm, and R5=3 Mohm. In this case, when Dg is lighted, if the voltage drop Vdrop_tx of the current driving circuit 72 is 0.6 V, the voltage at the output terminal Vout of the voltage conversion circuit 71 may be controlled to be "Vout=5.15 V"; if the voltage drop Vdrop_tx of the current driving circuit 72 is 0.7 V, the voltage at the output terminal Vout of the voltage conversion circuit 71 may be controlled to be "Vout=5.05 V"; or if the voltage drop Vdrop_tx of the current driving circuit 72 is 1 V, the voltage at the output terminal Vout of the voltage conversion circuit 71 is adjusted to "Vout=4.75 V". This is shown in Table 2.

TABLE 2

| Vdrop_tx | Vout | VF_G | Maximum current (mA) that can be supported by Dg |
|---|---|---|---|
| 0.6 | 5.15 | 4.55 | >200 |
| 0.7 | 5.05 | 4.35 | 200 |
| 0.8 | 4.95 | 4.15 | 160 |
| 0.9 | 4.85 | 3.95 | 100 |
| 1 | 4.75 | 3.75 | 80 |
| 1.2 | 4.55 | 3.35 | 40 |

It can be learned from Table 2 that, if Dg works at 40 mA, and the voltage conversion circuit 71 is configured to fixedly output 5.15 V, an additional voltage drop of 0.6 V (5.15-4.55) is wasted on the current driving circuit 72. Through automatic voltage adjustment control in this solution, a voltage additionally wasted on the current driving circuit 72 can be decreased, thereby improving power supply efficiency of a light-emitting device and reducing power consumption of an entire system.

Optionally, as shown in FIG. 10, the current driving circuit 72 includes a current source 722 and a transfer switch circuit 721, a common terminal of the transfer switch circuit 721 is coupled to the current source 722, and any light-emitting device is coupled to any selection terminal of the transfer switch circuit 721. The first control signal includes a switch control signal and a current control signal. The transfer switch circuit 721 is configured to connect, based on the switch control signal, the common terminal and a selection terminal coupled to the first light-emitting device, to couple the current source 722 to the first light-emitting device. The current source 722 is configured to provide the predetermined current for the first light-emitting device based on the current control signal.

It should be noted that, the controller provided in the foregoing embodiments may directly reuse the processor 120 shown in FIG. 1C, or the controller in this embodiment of this application may be configured and managed by using a chip or the processor 120 that has a control function in the electronic device in FIG. 1C.

Figure 11:
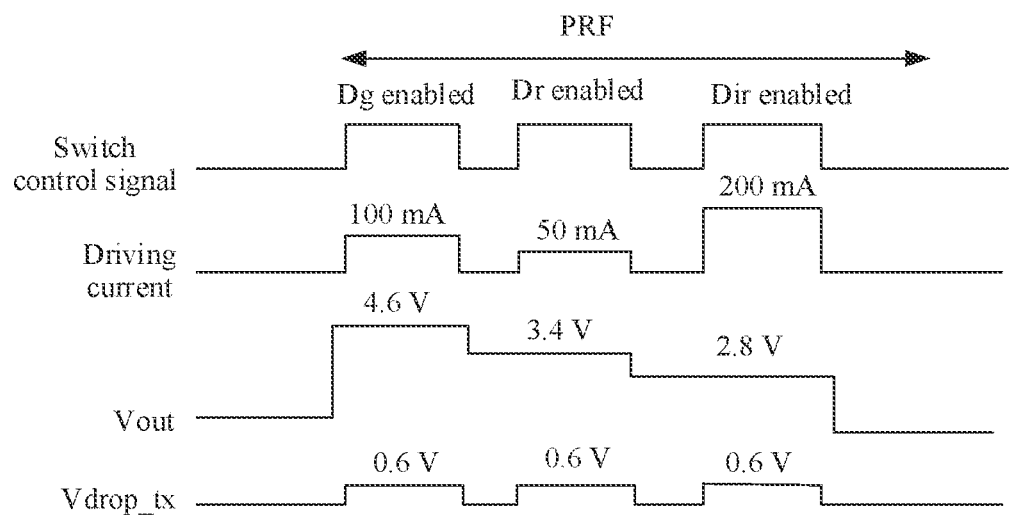
FIG. 11 is a signal sequence diagram of a light-emitting device driving circuit according to another embodiment of this application.

In addition, in an example, when the voltage at the output terminal Vout of the voltage conversion circuit 71 is dynamically adjusted in the foregoing manner, corresponding waveforms of signal sequences are shown in FIG. 11. The switch control signal is output by the controller 73 to the current driving circuit 72, to control the transfer switch circuit 721 to respectively connect the light-emitting devices to the current source one by one (as shown in FIG. 11, when Dg is controlled to be connected to the current source, Dg is enabled, and a current at the output terminal of the voltage conversion circuit 71 flows through the cathode of Dg from an anode, and then flows through the current source to the ground through the transfer switch circuit 721, where a magnitude of the current is determined by a magnitude of a current set by the current source, and is specifically set by controlling the current source by the current control signal). The driving current is a current of the current source set based on a lighting sequence of each light-emitting device. After the voltage at the output terminal Vout of the voltage conversion circuit 71 is dynamically adjusted in the foregoing manner (as shown in FIG. 11, during enabling of Dg, the driving current is 100 mA, and the voltage at the output terminal Vout of the voltage conversion circuit 71 is 4.6 V; during enabling of Dr, the driving current is 50 mA, and the voltage at the output terminal Vout of the voltage conversion circuit 71 is 3.4 V; and during enabling of Dir, the driving current is 200 mA, and the voltage at the output terminal Vout of the voltage conversion circuit 71 is 2.8 V), the voltage drop Vdrop_tx of the current driving circuit 72 is stabilized at a same voltage value 0.6 V, so as to decrease a voltage additionally wasted on the current driving circuit 72, thereby improving power supply efficiency of a light-emitting device and reducing power consumption of an entire system.

Figure 12:
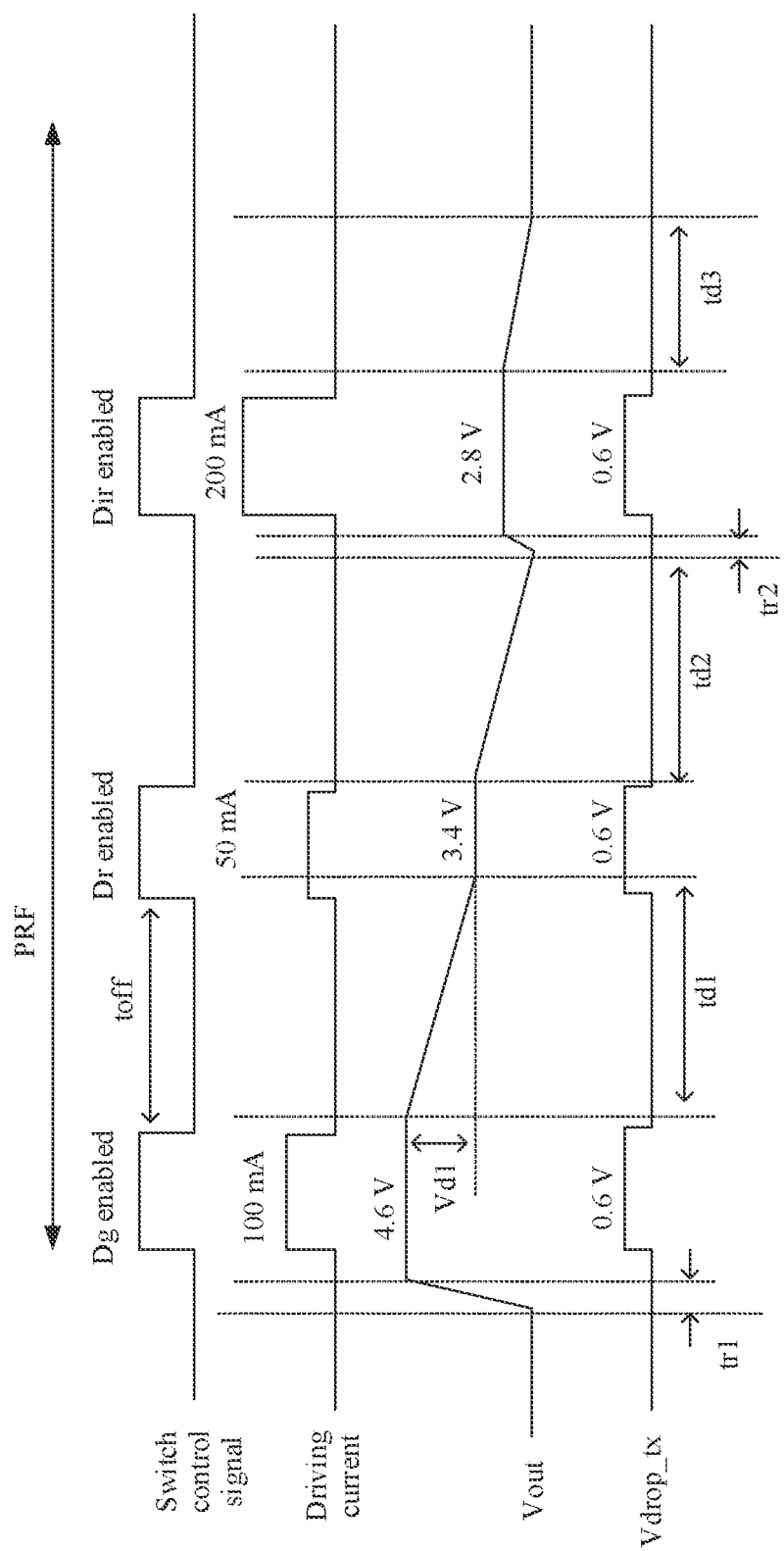
FIG. 12 is a signal sequence diagram of a light-emitting device driving circuit according to still another embodiment of this application.

In actual working, the voltage conversion circuit 71 is a boost circuit. As shown in FIG. 12, a relationship between an output voltage of a boost circuit and a lighting sequence of a light-emitting device is provided. In an actual circuit, an output terminal of the boost circuit is usually grounded through a capacitor. The connected capacitor is mainly used to remove high-frequency noise coupled to the boost circuit and store energy, so that a voltage at the output terminal Vout of the boost circuit is constant, and noise in the voltage at the output terminal Vout is reduced. In a gap between lighting of every two light-emitting devices, there is a period of time during which no light is lighted, and this period of time is used for performing other processing by a system, as shown by "toff>0" in the figure. To ensure measurement performance of a PPG sensor, in a process or most time of lighting (the switch control signal controls the light-emitting device to be enabled, for example, during enabling of Dg, Dr, or Dir) of the light-emitting device, a power supply voltage of the light-emitting device needs to be kept unchanged (a headroom voltage of the current driving circuit 72 needs to be considered), or the power supply voltage of the light-emitting device needs to be kept greater than a voltage for keeping the light-emitting device working at a specified current. It is assumed that lighting time is ton (not shown in the figure), and time during which the power supply voltage is continuously stable or time during which the power supply voltage is greater than the voltage for keeping the light-emitting device working at the specified current (the headroom voltage of the current driving circuit 72 needs to be considered) is tvs (not shown in the figure). When tvs>ton, a power supply voltage of the boost circuit may cover the entire lighting time ton, to enable the light-emitting device to work normally in the entire lighting time ton. Certainly, it may alternatively be that tvs≤ton. In this case, the power supply voltage of the boost circuit may cover partial time tvs in the lighting time ton, to enable the light-emitting device to work normally. In FIG. 12, tr (tr1 and tr2) represents output voltage ramping time (rising time) during which the boost circuit is adjusted from a low voltage (or 0 V output) to a high voltage, tr1 represents rising time during which output of the boost circuit rises from 0 V to an expected voltage 4.6 V in each PRF from a start moment of lighting of Dg or before or after the start moment (in FIG. 12, this is before the start moment), td (td1, td2, and td3) represents time during which an output voltage of the boost circuit decreases from a high level to a low level, and td1 in FIG. 12 represents time during which the output voltage of the boost circuit decreases from the expected voltage 4.6 V for lighting of Dg to a 3.4 V voltage generated when Dr is lighted. The output terminal of the boost circuit is usually grounded through a large capacitor, and the capacitor needs to discharge electricity when the output voltage of the boost circuit decreases from a high level to a low level. Therefore, the time td is long. In a case of a same voltage difference, usually, td>> (far greater than) tr. To be specific, when the same voltage difference is changed in a charging and discharging process of the capacitor, discharging time is much longer than charging time. Certainly, if power consumption is not considered, the output terminal of the adjustable boost circuit may also be grounded in a toff process, to quickly release a voltage stored on the capacitor connected to the output terminal of the boost circuit. In this case, duration of td and that of tr generated when the same voltage difference is changed may be equivalent in the charging and discharging process.

In actual use, to better reduce power consumption, the boost circuit may be turned off in a toff phase, to reduce electric energy consumed by the boost circuit itself. Further, a leakage loss generated when the boost circuit and the capacitor are turned off may be reduced through a design. For example, resistance to earth of the boost circuit generated when the boost circuit is turned off may be improved through a design or a process, or a capacitor with a small leakage loss may be used.

In actual use, lighting sequences of light-emitting devices may be configured in descending order of expected voltages output by the boost circuit. Therefore, the controller is further configured to sequentially output, to the current driving circuit in descending order or ascending order of voltages at the output terminal of the voltage conversion circuit that correspond to at least two light-emitting devices, the first control signal corresponding to each light-emitting device. As shown in FIG. 12, a lighting sequence of at least one light-emitting device is controlled in descending order of expected voltages output by the boost circuit, or the lighting sequence of the at least one light-emitting device may be controlled in ascending order of the expected voltage outputs by the boost circuit. In this way, the voltage at the output terminal of the boost circuit may change in a specific sequence in a process of lighting the light-emitting devices. In this way, in a PRF periodicity, a boost capacitor is in a continuous charging state or a continuous discharging state, thereby avoiding a loss caused by alternating charging and discharging of the capacitor in a PRF periodicity.

In the foregoing embodiment, the boost circuit may have one or more of a bypass (bypass) function and a down mode (down mode) function. If the boost circuit does not have the bypass function, when an expected voltage value output by the boost circuit is lower than a minimum output voltage of the boost circuit, the boost circuit outputs the minimum output voltage. If the boost circuit has the bypass function but does not have the down mode function, when the expected voltage value output by the boost circuit is lower than or equal to an input voltage (Vin) of the boost circuit, the boost circuit outputs the input voltage Vin. For the foregoing two boost circuits, when the expected voltage value output by the boost circuit is lower than the input voltage (Vin) of the boost circuit, an output voltage of an adjustable boost circuit is still Vin, and a voltage difference between Vin and the expected voltage value output by the boost circuit is superimposed on the headroom voltage of the current driving circuit 72. As a result, the voltage drop of the current driving circuit 72 is increased, and an additional power consumption waste is generated. If the boost circuit has both the bypass function and the down mode function, when the expected voltage value output by the boost circuit is lower than or equal to the input voltage (Vin) of the boost circuit, the boost circuit outputs the expected voltage value. The voltage difference between Vin and the expected voltage values falls on the boost circuit, and is consumed by the boost circuit. In this case, the headroom voltage of the current driving circuit 72 does not increase, and additional power consumption is wasted on the boost circuit. To resolve the problem, a buck-boost circuit may be used to replace the boost circuit, to further reduce power consumption additionally consumed. When an expected voltage value is lower than an input voltage of the buck-boost, the buck-boost circuit works in a buck mode, and the buck-boost circuit pumps the high input voltage to a low output voltage. When the expected voltage value is higher than the input voltage of the buck-boost circuit, the buck-boost circuit works in a boost mode, and the buck-boost circuit pumps the low input voltage to a high output voltage. When the expected voltage value is approximately equal to the input voltage of the buck-boost circuit, the buck-boost circuit may work in a bypass mode (that is, a pass-through mode), and the buck-boost circuit directly outputs the input voltage to the output terminal as an output voltage.

The voltage conversion circuit, the controller, the current driving circuit, the memory, and the like may be integrated inside a same chip in any combination, or may be respectively disposed in different chips on a PCB, for example, may be all integrated into an analog front end (analog front end, AFE) chip.

In the foregoing embodiments, the description of each embodiment has a focus. For a part that is not described in detail in an embodiment, refer to related descriptions in other embodiments.

Although this application is described with reference to specific features and embodiments thereof, apparently, various modifications and combinations may be made to this application without departing from the spirit and scope of this application. Correspondingly, the specification and accompanying drawings are merely example descriptions of this application defined by the appended claims, and are considered as covering any or all of modifications, variations, combinations, or equivalents falling within the scope of this application. Apparently, a person skilled in the art can make various modifications and variations to this application without departing from the spirit and scope of this application. This application is intended to cover these modifications and variations made to this application provided that they fall within the scope of the claims of this application and an equivalent technology thereof.

What is claimed is:

1. A light-emitting device driving circuit comprising:
a first resistor;
a first point;
a second resistor coupled to the first resistor at the first point;
a voltage conversion circuit comprising:
   a feedback terminal coupled to the first point;
   a ground terminal; and
   an output terminal, wherein the first resistor and the second resistor are coupled in series between the output terminal and the ground terminal;
a controller configured to output a first control signal;
a current driving circuit coupled to the controller and configured to:
   receive the first control signal; and
   provide a current based on the first control signal;
a second point;
at least one light-emitting device, wherein a first light-emitting device of the at least one light-emitting device is coupled in series between the output terminal and the current driving circuit, further coupled to the current driving circuit at the second point, and configured to receive the current; and
a third resistor coupled to and positioned between the feedback terminal and the second point,
wherein the voltage conversion circuit is configured to:
   decrease a third voltage at the output terminal when a first voltage at the feedback terminal is greater than a predetermined voltage value; and
   increase the third voltage when a second voltage at the feedback terminal is less than the predetermined voltage value.

2. The light-emitting device driving circuit of claim 1, wherein the first control signal comprises a switch control signal and a current control signal, and wherein the current driving circuit comprises:
a current source configured to provide the current for the first light-emitting device based on the current control signal; and
a transfer switch circuit comprising:
   a common terminal coupled to the current source; and
   at least one selection terminal coupled to the at least one light-emitting device, and
wherein the transfer switch circuit is configured to couple, based on the switch control signal, the common terminal and a first selection terminal that is of the at least one selection terminal and that is coupled to the first light-emitting device to couple the current source to the first light-emitting device.

3. The light-emitting device driving circuit of claim 1, wherein the controller is further configured to sequentially output, to the current driving circuit in descending order of voltages at the output terminal that correspond to at least two light-emitting devices, the first control signal corresponding to each of the at least two light-emitting devices.

4. The light-emitting device driving circuit of claim 1, wherein the controller is further configured to sequentially output, to the current driving circuit in ascending order of voltages at the output terminal that correspond to at least two light-emitting devices, the first control signal corresponding to each of the at least two light-emitting devices.

5. The light-emitting device driving circuit of claim 1, wherein the voltage conversion circuit further comprises a boost circuit.

6. The light-emitting device driving circuit of claim 5, further comprising a capacitor, wherein the output terminal is configured to couple to ground through the capacitor.

7. The light-emitting device driving circuit of claim 1, wherein the voltage conversion circuit further comprises a buck-boost circuit.

8. A photoplethysmography (PPG) sensor comprising:
a light-emitting device driving circuit comprising:
   a first resistor;
   a first point;
   a second resistor coupled to the first resistor at the first point;
   a voltage conversion circuit comprising:
      a feedback terminal coupled to the first point;
      a ground terminal; and
      an output terminal, wherein the first resistor and the second resistor are coupled in series between the output terminal and the ground terminal;
   a controller configured to output a first control signal;
   a current driving circuit coupled to the controller and configured to:
      receive the first control signal; and
      provide a current based on the first control signal;
   a second point;
   at least one light-emitting device, wherein a first light-emitting device of the at least one light-emitting device is coupled in series between the output terminal and the current driving circuit, further coupled to the current driving circuit at the second point, and configured to:
      receive the current; and
      output a test optical signal based on the current; and
   a third resistor coupled to and positioned between the feedback terminal and the second point,
   wherein the voltage conversion circuit is configured to:
      decrease a third voltage at the output terminal when a first voltage at the feedback terminal is greater than a predetermined voltage value; and
      increase the third voltage when a second voltage at the feedback terminal is less than the predetermined voltage value; and
a detector coupled to the light-emitting device driving circuit and configured to detect the test optical signal that is reflected or scattered by a detected object.

9. The PPG sensor of claim 8, wherein the first control signal comprises a switch control signal and a current control signal, and wherein the current driving circuit comprises:
a current source configured to provide the current for the first light-emitting device based on the current control signal; and
a transfer switch circuit comprising:
   a common terminal coupled to the current source; and
   at least one selection terminal coupled to the at least one light-emitting device, and
wherein the transfer switch circuit is configured to couple, based on the switch control signal, the common terminal and a first selection terminal that is of the at least one selection terminal and that is coupled to the first light-emitting device to couple the current source to the first light-emitting device.

10. The PPG sensor of claim 8, wherein the controller is further configured to sequentially output, to the current driving circuit in descending order of voltages at the output terminal that correspond to at least two light-emitting devices, the first control signal corresponding to each of the at least two light-emitting devices.

11. The PPG sensor of claim 8, wherein the controller is further configured to sequentially output, to the current driving circuit in ascending order of voltages at the output terminal that correspond to at least two light-emitting devices, the first control signal corresponding to each of the at least two light-emitting devices.

12. The PPG sensor of claim 8, wherein the voltage conversion circuit further comprises a boost circuit.

13. The PPG sensor of claim 8, wherein the output terminal is grounded through a capacitor.

14. The PPG sensor of claim 8, wherein the voltage conversion circuit further comprises a buck-boost circuit.

15. An electronic device comprising:
a photoplethysmography (PPG) sensor comprising:
  a light-emitting device driving circuit comprising:
    a first resistor;
    a first point;
    a second resistor coupled to the first resistor at the first point;
  a voltage conversion circuit comprising:
    a feedback terminal coupled to the first point;
    a ground terminal; and
    an output terminal, wherein the first resistor and the second resistor are coupled in series between the output terminal and the ground terminal;
  a controller configured to output a first control signal;
  a current driving circuit coupled to the controller and configured to:
    receive the first control signal; and
    provide a current based on the first control signal;
  a second point;
  at least one light-emitting device, wherein a first light-emitting device of the at least one light-emitting device is coupled in series between the output terminal and the current driving circuit, further coupled to the current driving circuit at the second point, and configured to:
    receive the current;
    output a test optical signal based on the current; and
  a third resistor coupled to and positioned between the feedback terminal and the second point,
  wherein the voltage conversion circuit is configured to:
    decrease a third voltage at the output terminal when a first voltage at the feedback terminal is greater than a predetermined voltage value; and
    increase the third voltage when a second voltage at the feedback terminal is less than the predetermined voltage value; and
  a detector coupled to the light-emitting device driving circuit and configured to detect the test optical signal that is reflected or scattered by a detected object.

16. The electronic device of claim 15, wherein the first control signal comprises a switch control signal and a current control signal, and wherein the current driving circuit comprises:
a current source configured to provide the current for the first light-emitting device based on the current control signal; and
a transfer switch circuit comprising:
  a common terminal coupled to the current source; and
  at least one selection terminal coupled to the at least one light-emitting device, and
wherein the transfer switch circuit is configured to couple, based on the switch control signal, the common terminal and a first selection terminal that is of the at least one selection terminal and that is coupled to the first light-emitting device to couple the current source to the first light-emitting device.

17. The electronic device of claim 15, wherein the controller is further configured to sequentially output, to the current driving circuit in descending order of voltages at the output terminal that correspond to at least two light-emitting devices, the first control signal corresponding to each of the at least two light-emitting devices.

18. The electronic device of claim 15, wherein the controller is further configured to sequentially output, to the current driving circuit in ascending order of voltages at the output terminal that correspond to at least two light-emitting devices, the first control signal corresponding to each of the at least two light-emitting devices.

19. The electronic device of claim 15, wherein the voltage conversion circuit further comprises a boost circuit.

20. The electronic device of claim 15, wherein the voltage conversion circuit further comprises a buck-boost circuit.

* * * * *